(12) United States Patent
Lang et al.

(10) Patent No.: US 6,314,420 B1
(45) Date of Patent: *Nov. 6, 2001

(54) COLLABORATIVE/ADAPTIVE SEARCH ENGINE

(75) Inventors: Andrew K. Lang; Donald M. Kosak, both of Pittsburgh, PA (US)

(73) Assignee: Lycos, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/204,149

(22) Filed: Dec. 3, 1998

Related U.S. Application Data

(63) Continuation-in-part of application No. 08/627,436, filed on Apr. 4, 1996, now Pat. No. 5,867,799.

(51) Int. Cl.[7] .................................................... G06F 17/30
(52) U.S. Cl. ................................... 707/3; 707/10; 707/2; 707/5
(58) Field of Search ................................ 707/1, 10, 102, 707/3, 2, 5

(56) References Cited

U.S. PATENT DOCUMENTS

| | | | | |
|---|---|---|---|---|
| 5,019,961 | * | 5/1991 | Addesso et al. ..................... | 364/192 |
| 5,117,349 | * | 5/1992 | Tirfing et al. ............................. | 707/5 |
| 5,249,262 | * | 9/1993 | Baule ..................................... | 395/66 |
| 5,471,610 | * | 11/1995 | Kawaguchi et al. ..................... | 707/4 |
| 5,537,586 | * | 7/1996 | Amram et al. ............................. | 707/3 |
| 5,544,049 | * | 8/1996 | Henderson et al. ............ | 364/419.19 |
| 5,563,998 | * | 10/1996 | Yaksich et al. ....................... | 395/149 |
| 5,563,999 | * | 10/1996 | Yaksich et al. ....................... | 395/149 |
| 5,608,447 | * | 3/1997 | Farry et al. .............................. | 348/7 |
| 5,649,186 | * | 7/1997 | Ferguson ................................ | 707/10 |
| 5,842,199 | * | 11/1998 | Miller et al. ............................. | 707/2 |
| 5,867,799 | * | 2/1999 | Lang et al. ............................... | 707/1 |
| 5,983,214 | * | 11/1999 | Lang et al. ............................... | 707/1 |
| 6,006,222 | | 12/1999 | Culliss ..................................... | 707/5 |
| 6,014,665 | | 1/2000 | Culliss ..................................... | 707/5 |
| 6,029,161 | * | 2/2000 | Lang et al. ............................... | 707/1 |
| 6,078,916 | | 6/2000 | Culliss ..................................... | 707/5 |
| 6,182,068 | | 1/2001 | Culliss ..................................... | 707/5 |

OTHER PUBLICATIONS

Michael Persin, Document Filtering for Fast Ranking, Proceeding of the seventeenth annual international ACM–SIGIR conference on research and development in information retrieval, Jul. 6, 1994, pp. 339–348.*

\* cited by examiner

*Primary Examiner*—Thomas Black
*Assistant Examiner*—Frantz Coby
(74) *Attorney, Agent, or Firm*—Testa, Hurwitz & Thibeault, LLP

(57) ABSTRACT

A search engine system is provided for a portal site on the internet. The search engine system employs a regular search engine to make one-shot or demand searches for information entities which provide at least threshold matches to user queries. The search engine system also employs a collaborative/content-based filter to make continuing searches for information entities which match existing wire queries and are ranked and stored over time in user-accessible, system wires corresponding to the respective queries. A user feedback system provides collaborative feedback data for integration with content profile data in the operation of the collaborative/content-based filter. A query processor determines whether a demand search or a wire search is made for an input query.

36 Claims, 10 Drawing Sheets

COLLABORATIVE/ADAPTIVE SEARCH ENGINE

This application is a continuation-in-part of copending application Ser. No. 08/627,436 filed on Apr. 4, 1996 now U.S Pat. No. 5,867,799, the entire contents of which are hereby incorporated by reference.

BACKGROUND OF THE INVENTION

The present invention relates to information processing systems for large or massive information networks, such as the internet, and more particularly to such information systems especially adapted for operation in portal and other web sites wherein a search engine operates with collaborative and content-based filtering to provide better search responses to user queries.

In the operation of the internet, a countless number of information are available for downloading from any of at least thousands of sites for consideration by a user at the user's location. A user typically connects to a portal or other web site having a search capability, and thereafter enters a particular query, i.e., a request for information relevant to a topic, a field of interest, etc. Thereafter, the search site typically employs a "spider" scanning system and a content-based filter in a search engine to search the internet and find information which match the query. This process is basically a pre-search process in which matching informons are found, at the time of initiating a search for the user's query, by comparing informons in an "informon data base" to the user's query. In essence, the pre-search process is a short term search for quickly finding and quickly identifying information entities which are content matched to the user's query.

The return list of matching informons can be very extensive according to the subject of the query and the breadth of the query. More specific queries typically result in shorter return lists. In some cases, the search site may also be structured to find web sites which probably have stored informons matching the entered query.

Collaborative data can be made available to assist in informon rating when a user actually downloads an informon, considers and evaluates it, and returns data to the search site as a representation of the value of the considered informon to the user.

In the patent application which is parent to this continuation-in-part application, i.e. Ser. No. 08/627,436, filed by the present inventors on Apr. 4, 1996, now U.S. Pat. No. 5,867,799 and hereby incorporated by reference, an advanced collaborative/content-based information filter system is employed to provide superior filtering in the process of finding and rating informons which match a user's query. The information filter structure in this system integrates content-based filtering and collaborative filtering to determine relevancy of informons received from various sites in the Internet or other network. In operation, a user enters a query and a corresponding "wire" is established, i.e., the query is profiled in storage on a content basis and adaptively updated over time, and informons obtained from the network are compared to the profile for relevancy and ranking. A continuously operating "spider" scans the network to find informons which are received and processed to determine relevancy to the individual user's wire or to wires established by numerous other users.

The integrated filter system compares received informons to the individual user's query profile data, combined with collaborative data, and ranks, in order of value, informons found to be relevant. The system maintains the ranked informons in a stored list from which the individual user can select any listed informon for consideration.

As the system continues to feed the individual user's "wire", the stored relevant informon list typically changes due to factors including a return of new and more relevant informons, adjustments in the user's query, feedback evaluations by the user for considered informons, and updatings in collaborative feedback data. Received informons are similarly processed for other users' wires established in the information filter system. Thus, the integrated information filter system performs continued long-term searching, i.e., it compares network informons to multiple users' queries to find matching informons for various users' wires over the course of time, whereas conventional search engines initiate a search in response to an individual user's query and use content-based filtering to compare the query to accessed network informons typically to find matching informons during a limited, short-term search time period.

The present invention is directed to an information processing system especially adapted for use at internet portal or other web sites to make network searches for information entities relevant to user queries, with collaborative feedback data and content-based data and adaptive filter structuring, being used in filtering operations to produce significantly improved search results.

SUMMARY OF THE INVENTION

A search engine system employs a content-based filtering system for receiving informons from a network on a continuing basis and for filtering the informons for relevancy to a wire or demand query from an individual user. A feedback system provides feedback data from other users.

Another system controls the operation of the filtering system to filter for one of a wire response and a demand response and to return the one response to the user. The filtering system combines pertaining feedback data from the feedback system with content profile data in determining the relevancy of the informons for inclusion in at least a wire response to the query.

DETAILED DESCRIPTION OF THE EMBODIMENTS

Figure 1:
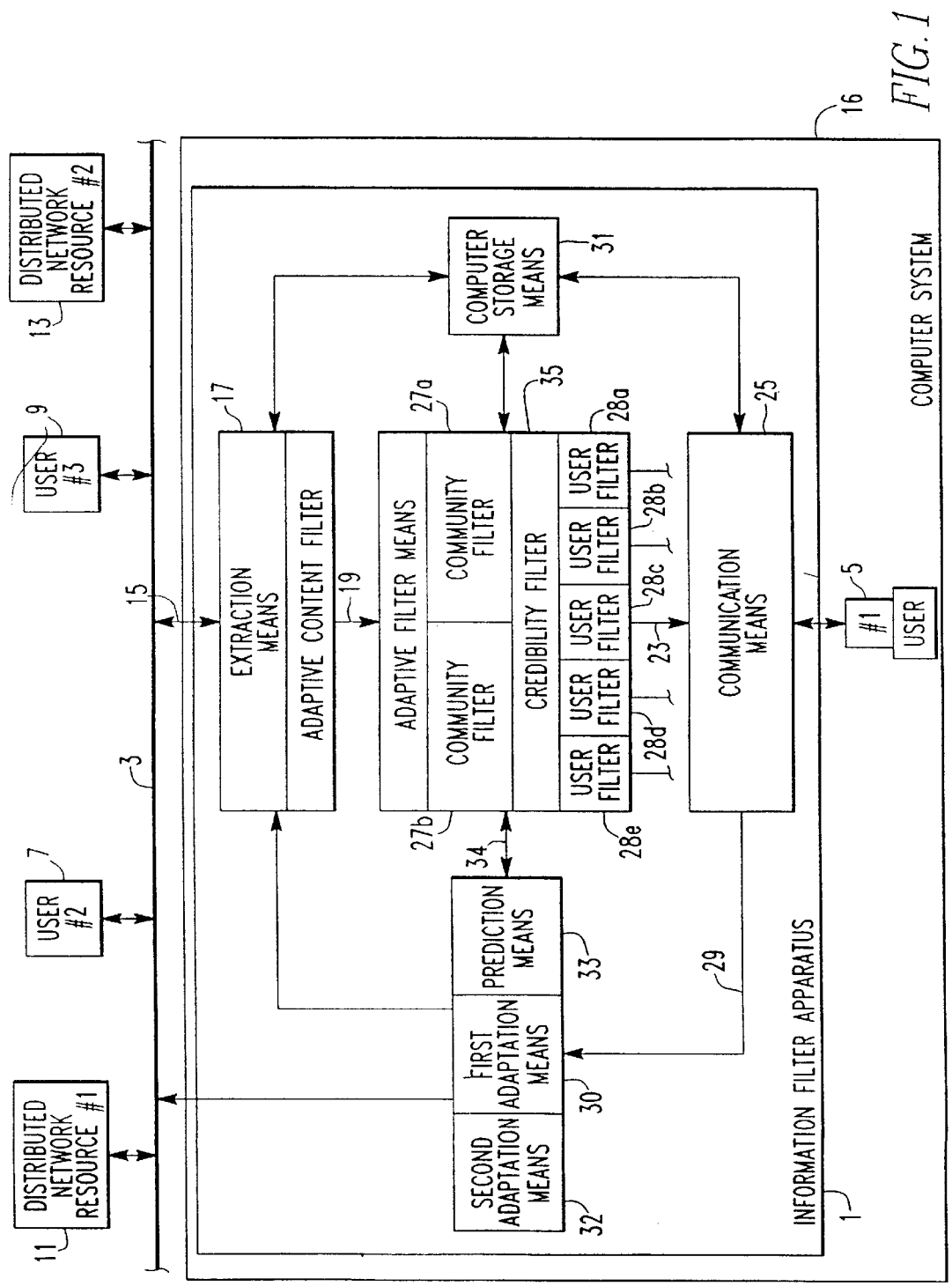
FIG. 1 is an diagrammatic representation of an embodiment of an information filtering apparatus according to the present invention.

The invention herein is preferably configured with an apparatus and method for information filtering in a computer system receiving a data stream from a computer network, in which entities of information relevant to the user, or "informons," are extracted from the data stream using content-based and collaborative filtering. The information filtering is long term in the sense that it operates on a continuing basis, and is both interactive and distributed in structure and method. It is interactive in that communication is substantially big-directional at each level of the filter. It is distributed in that all or part of the information filter can include a purely hierarchical (up-and-down/parent-child) structure or method, a purely parallel (peer-to-peer) structure or method, or a combination of hierachical and parallel structures and method.

As used herein, the term "informon" comprehends an information entity of potential or actual interest to a particular user. In general, informons can be heterogenous in nature and can be all or part of a textual, a visual, or an audio entity. Also, informons can be composed of a combination of the aforementioned entities, thereby being a multimedia entity. Furthermore, an informon can be an entity of patterned data, such as, a data file containing a digital representation of signals and can be a combination of any of the previously-mentioned entities. Although some of the data in a data stream, including informons, may be included in an informon, not all data is relevant to a user, and is not within the definition of an informon. By analogy, an informon may be considered to be a "signal," and the total data stream may be considered to be "signal +noise." Therefore, an information filtering apparatus is analogous to other types of signal filters in that it is designed to separate the "signal" from the "noise."

Also as used herein, the term "user" is an individual in communication with the network. Because an individual user can be interested in multiple categories of information, the user can be considered to be multiple clients each having a unique profile, or set of attributes. Each member client profile, then, is representative of a particular group of user preferences. Collectively, the member client profiles associated with each user is the user profile. The present invention can apply the learned knowledge of one of a user's member clients to others of the user's member clients, so that the importance of the learned knowledge, e.g., the user's preference for a particular author in one interest area as represented by the member client, can increase the importance of that particular factor, A's authorship, for others of the user's member clients. Each of the clients of one user can be associated with the individual clients of other users insofar as the profiles of the respective clients have similar attributes. A "community" is a group of clients, called member clients, that have similar member client profiles, i.e., that share a subset of attributes or interests. In general, the subset of shared attributes forms the community profile for a given community and is representative of the community norms, or common client attributes.

The "relevance" of a particular informon broadly describes how well it satisfies the user's information need. The more relevant an informon is to a user, the higher the "signal" content. The less relevant the informon, the higher the "noise" content. Clearly, the notion of what is relevant to a particular user can vary over time and with context, and the user can find the relevance of a particular informon limited to only a few of the user's potentially vast interest areas. Because a user's interests typically change slowly, relative to the data stream, it is preferred to use adaptive procedures to track the user's current interests and follow them over time. Provision, too, is preferred to be made for sudden changes in interest, e.g., taking up antiquarian sword collecting and discontinuing stamp collecting, so that the method and apparatus track the evolution of "relevance" to a user and the communities of which the user is a member. In general, information filtering is the process of selecting the information that a users wishes to see, i.e., informons, from a large amount of data. Content-based filtering is a process of filtering by extracting features from the informon, e.g., the text of a document, to determine the informon's relevance. Collaborative filtering, on the other hand, is the process of filtering informons, e.g., documents, by determining what informons other users with similar interests or needs found to be relevant.

The system apparatus includes a filter structure having adaptive content based filters and adaptive collaborative filters, which respectively include, and respond to, an adaptive content profile and an adaptive collaboration profile. As used herein, the term "content-based filter" means a filter in which content data, such as key words, is used in performing the filtering process. In a collaborative filter, other user data is used in performing the filtering process. A collaborative filter is also sometimes referred to as a "content" filter since it ultimately performs the task of finding an object or document having content relevant to the content desired by a user. If there are some instances herein where the term "content filter" is used as distinguished from a collaborative filter, it is intended that the term "content filter" mean "content-based filter." The adaptive filters each are preferred to include at least a portion of a community filter for each community serviced by the apparatus, and a portion of a member client filter for each member client of the serviced communities. For this reason, the adaptive filtering is distributed in that each of the community filters perform adaptive collaborative filtering and adaptive content filtering, even if on different levels, and even if many filters exist on a given level. The integrated filtering permits an individual user to be a unique member client of multiple communities, with each community including multiple member clients sharing similar interests. The adaptive features permit the interests of member clients and entire communities to change gradually over time. Also a member client has the ability to indicate a sudden change in preference, e.g., the member client remains a collector but is no longer interested in coin collecting.

The filter structure also implements adaptive credibility filtering, providing member clients with a measure of informon credibility, as judged by other member clients in the community. For example, a new member client in a first community, having no credibility, can inject an informon into the data flow, thereby providing other member clients in other communities with the proposed informon, based on the respective community profile and member client profiles. If the other member clients believe the content of the informon to be credible, the adaptive credibility profile will reflect a growing credibility. Conversely, feedback profiles from informon recipients that indicate a lack of credibility cause the adaptive credibility profile, for the informon author to reflect untrustworthiness. However, the growth and declination of credibility are not "purely democratic," in the sense that one's credibility is susceptible to the bias of others' perceptions, so the growth or declination of one's credibility is generally proportional to how the credibility of the new member client is viewed by other member clients.

Member clients can put their respective reputations "on the line," and engage in spirited discussions which can be refereed by other interested member clients. The credibility profile further can be partitioned to permit separate credibility sub-profiles for the credibility of the content of the informon, the author, the author's community, the reviewers, and the like, and can be fed back to discussion participants, reviewers, and observers to monitor the responses of others to the debate. The adaptive credibility profiles for those member clients with top credibility ratings in their communities may be used to establish those member clients as "experts" in their respective communities.

With this functionality, additional features can be implemented, including, for example, "instant polling" on a matter of political or consumer interest. In conjunction with both content and collaborative filtering, credibility filtering, and the resulting adaptive credibility profiles, also may be used to produce other features, such as on-line consultation and recommendation services. Although the "experts" in the communities most closely related to the topic can be afforded special status as such, member clients from other communities also can participate in the consultation or recommendation process.

In one embodiment of the consultation service, credibility filtering can be augmented to include consultation filtering. With this feature, a member client can transmit an informon to the network with a request for guidance on an issue, for example, caring for a sick tropical fish. Other member clients can respond to the requester with informons related to the topic, e.g., suggestions for water temperature and antibiotics. The informons of the responders can include their respective credibility profiles, community membership, and professional or avocational affiliations. The requester can provide feedback to each of the responders, including a rating of the credibility of the responder on the particular topic. Additionally, the responders can accrue quality points, value tokens, or "info bucks," as apportioned by the requester, in return for useful guidance.

Similarly, one embodiment of an on-line recommendation service uses recommendation filtering and adaptive recommendation profiles to give member clients recommendations on matters as diverse as local auto mechanics and world-class medieval armor refurbishers. In this embodiment, the requester can transmit the informon to the network bearing the request for recommendation. Other member clients can respond to the requester with informons having specific recommendations or dis-recommendations, advice, etc. As with the consultation service, the informons of the responders can be augmented to include their respective credibility profiles, community membership, and professional or avocational affiliations. A rating of each recommendation provided by a responder, relative to other responders' recommendations, also can be supplied. The requester can provide feedback to each of the responders, including a rating of the credibility of the responder on the particular topic, or the quality of the recommendation. As before, the responders can accrue quality points, value tokens, or "info bucks," as apportioned by the requester, in return for the useful recommendation.

Furthermore, certain embodiments are preferred to be self-optimizing in that some or all of the adaptive filters used in the system dynamically seek optimal values for the function intended by the filter, e.g., content analysis, collaboration, credibility, reliability, etc.

The filter structure herein is capable of identifying, the preferences of individual member clients and communities, providing direct and inferential consumer preference information, and tracking shifts in the preferences whether the shifts be gradual or sudden. The consumer preference information can be used to target particular consumer preference groups, or cohorts, and provide members of the cohort with targeted informons relevant to their consumer preferences. This information also may be used to follow demographical shifts so that activities relying on accurate demographical data, such as retail marketing, can use the consumer preference information to anticipate evolving consumer needs in a timely manner.

To provide a basis for adaptation, it is preferred that each raw informon be processed into a standardized vector, which may be on the order of 20,000 to 100,000 tokens long. The learning and optimization methods that ultimately are chosen are preferred to be substantially robust to the problems which can be presented by such high-dimensional input spaces. Dimensionality reduction using methods such as the singular value decomposition (SVD), or auto-encoding neural networks attempt to reduce the size of the space while initially retaining the information contained in the original representation. However, the SVD can lose information during the transformation and may give inferior results. Two adaptation/learning methods that are presently preferred include the TF-IDF technique and the MDL technique.

FIG. 1 illustrates one embodiment of an information filtering apparatus 1 structured for search engine implementation in accordance with the invention as described subsequently herein in connection with FIGS. 8 and 9. In general, a data stream is conveyed through network 3, which can be a global internet work. A skilled artisan would recognize that apparatus 1 can be used with other types of networks, including, for example, an enterprise-wide network, or "intranet." Using network 3, User #1 (5) can communicate with other users, for example, User #2 (7) and User #3 (9), and also with distributed network resources such as resource #1 (11) and resource #2 (13).

Apparatus 1 is preferred to be part of computer system 16, although User #1 (5) is not required to be the sole user of computer system 16. In one present embodiment, it is preferred that computer system 16 having information filter apparatus 1 therein filters information for a plurality of users. One application for apparatus 1, for example, could be that user 5 and similar users may be subscribers to a commercial information filtering service, which can be provided by the owner of computer system 16.

Extraction means 17 can be coupled with, and receives data stream 15 from, network 3. Extraction means 17 can identify and extract raw informons 19 from data stream 15.

Each of the raw informons 19 has an information content. Extraction means 17 uses the adaptive content filter, and at least part of the adaptive content profile, to analyze the data stream for the presence of raw informons. Raw informons are those data entities whose content identifies them as being "in the ballpark," or of potential interest to a community coupled to apparatus 1. Extraction means 17 can remove duplicate informons, even if the informons arrive from different sources, so that user resources are not wasted by handling and viewing repetitive and cumulative information. Extraction means 17 also can use at least part of a community profile and a user profile for User #1 (5) to determine whether the informon content is relevant to the community of which User #1 is a part.

Filter means 21 adaptively filters raw informons 19 and produces proposed informons 23 which are conveyed to User #1 (5) by communication means 25. A proposed informon is a selected raw informon that, based upon the respective member client and community profiles, is predicted to be of particular interest to a member client of User 5. Filter means 21 can include a plurality of community filters 27a,b and a plurality of member client filters 28a–e, each respectively having community and member client profiles. When raw informons 19 are filtered by filter means 21, those informons that are predicted to be suitable for a particular member client of a particular community, e.g., User #1 (5), responsive to the respective community and member client profiles, are conveyed thereto. Where such is desired, filter means 21 also can include a credibility filter 35 which enables means 21 to perform credibility filtering of raw informons 19 according to a credibility profile.

It is preferred that the adaptive filtering performed within filter means 21 by the plurality of filters 27a,b, 28a–e, and 35, use a self-optimizing adaptive filtering so that each of the parameters processed by filters 27a,b, 28a–e, and 35, is driven continually to respective values corresponding to a minimal error for each individual parameter. Self-optimization encourages a dynamic, marketplace-like operation of the system, in that those entities having the most desirable value, e.g., highest credibility, lowest predicted error, etc., are favored to prevail.

Self-optimization can be effected according to respective preselected self-optimizing adaptation techniques including, for example, one or more of a top-key-word-selection adaptation technique, a nearest-neighbor adaptation technique, a term-weighting adaptation technique, a probabilistic adaptation technique, and a neural network learning technique. In one present embodiment of the invention, the term-weighting adaptation technique is preferred to be a TF-IDF technique and the probabilistic adaptation technique is preferred to be a MDL technique.

When user 5 receives proposed informon 23 from apparatus 1, user 5 is provided with multiple feedback queries along with the proposed informon. By answering, user 5 creates a feedback profile that corresponds to feedback response 29. User feedback response 29 can be active feedback, passive feedback, or a combination. Active feedback can include the user's numerical rating for an informon, hints, and indices. Hints can include like or dislike of an author, and informon source and timeliness. Indices can include credibility, agreement with consent or author, humor, or value. Feedback response 29 provides an actual response to proposed informon 23, which is a measure of the relevance of the proposed informon to the information need of user 5. Such relevance feedback attempts to improve the performance for a particular profile by modifying the profiles, based on feedback response 29.

A predicted response anticipated by adaptive filtering means 21 can be compared to the actual feedback response 29 of user 5 by first adaptation means 30, which derives a prediction error. First adaptation means 30 also can include prediction means 33, which collects a number of temporally-spaced feedback responses, to update the adaptive collaboration profile, the adaptive content profile, or both, with an adapted future prediction 34, in order to minimize subsequent prediction errors by the respective adaptive collaboration filter and adaptive content filter.

In one embodiment of the invention herein, it is preferred that prediction means 33 be a self-optimizing prediction means using a preselected learning technique.

Such techniques can include, for example, one or more of a op-key-word-selection learning technique, a nearest-neighbor learning technique, a term-weighting learning technique, and a probabilistic learning technique. First adaptation means 30 also can include a neural network therein and employ a neural network learning technique for adaptation and prediction. In one present embodiment of the invention, the term-weighting learning technique is preferred to be a TF-IDF technique and the probabilistic learning technique is preferred to be a MDL learning technique.

First adaptation means 30 further can include second adaptation means 32 for adapting at least one of the adaptive collaboration profiles, the adaptive content profiles, the community profile, and the user profile, responsive to at least one of the other profiles. In this manner, trends attributable to individual member clients, individual users, and individual communities in one domain of system 16 can be recognized by, and influence, similar entities in other domains (melding agent "minds"), contained within system 16 to the extent that the respective entities share common attributes.

Apparatus 1 also can include a computer storage means 31 for storing the profiles, including the adaptive content profile and the adaptive collaboration profile. Additional trend-tracking information can be stored for later retrieval in storage means 31, or may be conveyed to network 3 for remote analysis, for example, by User #2 (7).

Figure 2:
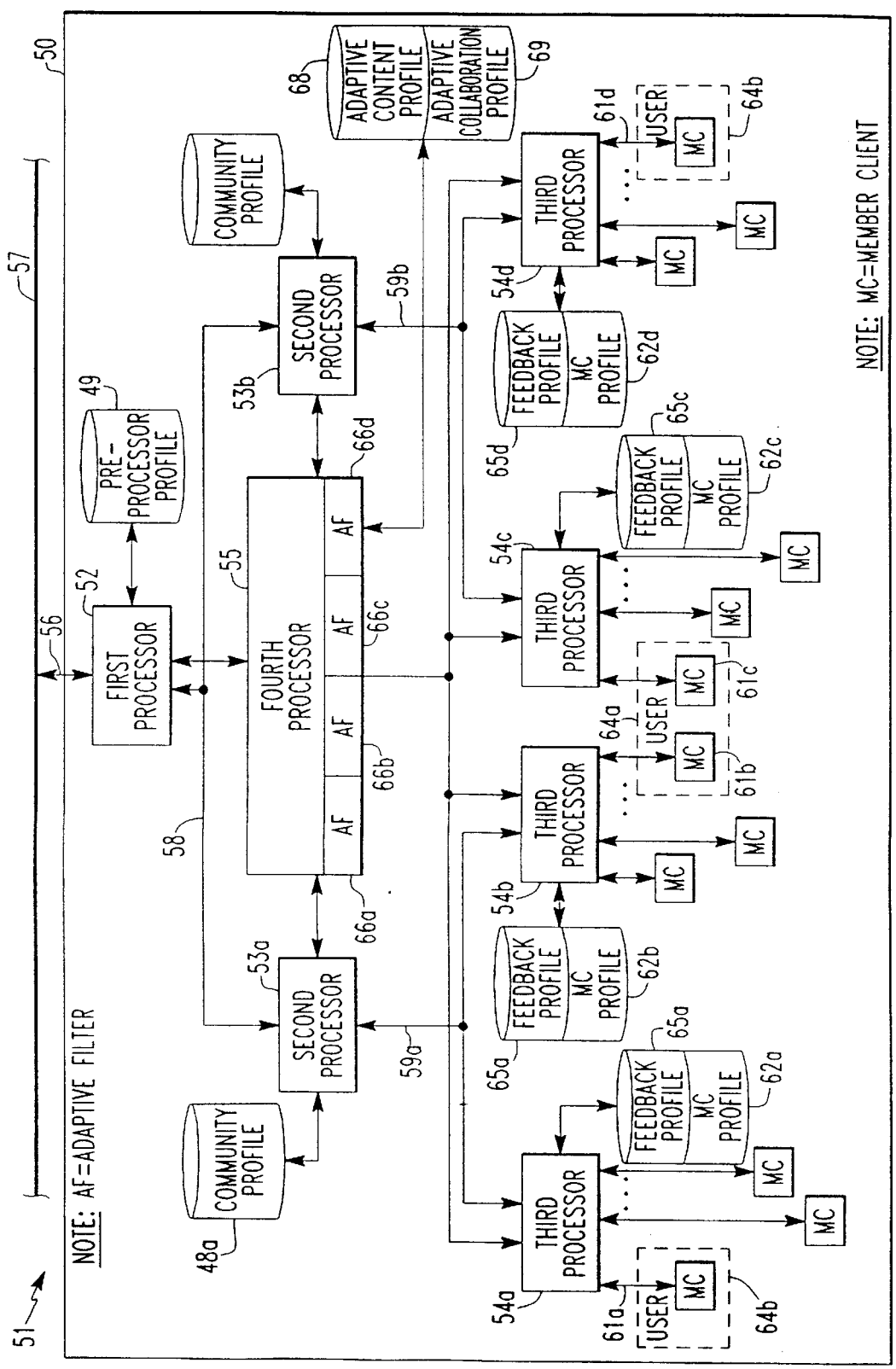
FIG. 2 is an diagrammatic representation of another embodiment of an information filtering apparatus according to the present invention.

FIG. 2 illustrates another preferred embodiment of information filtering apparatus 50, in computer system 51. Apparatus 50 can include first processor 52, second processor 53a,b, third processor 64a–d, and a fourth processor 55, to effect the desired information filtering. First processor 52 can be coupled to, and receive a data stream 56 from, network 57. First processor 52 can serve as a pre-processor by extracting raw informons 58 from data stream 56 responsive to preprocessing profile 49 and conveying informons 58 to second processor 53a,b.

Because of the inconsistencies presented by the nearly-infinite individual differences in the modes of conceptualization, expression, and vocabulary among users, even within a community of coinciding interests, similar notions can be described with vastly different terms and connotations, greatly complicating informon characterization. Mode variations can be even greater between disparate communities, discouraging interaction and knowledge-sharing among communities. Therefore, it is particularly preferred that processor 52 create a mode-invariant representation for each raw informon, thus allowing fast, accurate informon characterization and collaborative filtering. Mode-invariant representations tend to facilitate relevant informon selection and distribution within and among communities, thereby promoting knowledge-sharing, thereby benefitting the group of interlinked communities, i.e., a society, as well.

First processor 52 also can be used to prevent duplicate informons, e.g., the same information from different sources, from further penetrating, and thus consuming the resources of, the filtering process. Other processors 53,a,b, 54a–d, also may be used to perform the duplicate information elimination function, but additionally may measure the differences between the existing informon and new informons. That difference between the content of the informon the previous time the user reviewed it and the content of the informon in its present form is the "delta" of interest. Processors 53a,b, 54a–d may eliminate the informon from further processing, or direct the new, altered informon to the member client, in the event that nature or extent of the change exceeds a "delta" threshold. In general, from the notion of exceeding a preselected delta threshold, one may infer that the informon has changed to the extent that the change is interesting to the user. The nature of this change can be shared among all of a user's member clients. This delta threshold can be preselected by the user, or by the preselected learning technique. Such processing, or "delta learning" can be accomplished by second processor 53a,b, alone or in concert with third processor 54a–d. Indeed, third processor 54a–d can be the locus for delta learning, where processor 54a–d adapts a delta learning profile for each member client of the community, i.e. user, thus anticipating those changes in existing informons that the user may find "interesting."

Second processor 53a,b can filter raw informons 58 and extract proposed community informons 59a,b therefrom. Informons 59a,b are those predicted by processor 53a,b to be relevant to the respective communities, in response to a community profiles 48a,b that are unique to the communities. Although only two second processors 53a,b are shown in FIG. 2, system 51 can be scaled to support many more processors, and communities. It is presently preferred that second processor 53a,b extract community informons 59a,b using a two-step process. Where processor 52 has generated mode-invariant concept representations of the raw informons, processor 53a,b can perform concept-based indexing, and then provide detailed community filtering of each informon.

Third processors 54a–d can receive community informons 59a,b from processors 53a,b, and extract proposed member client informons 61a–d therefrom, responsive to unique member client profiles 62a–d for respective ones of member clients 63a–d. Each user can be represented by multiple member clients in multiple communities. For example, each of users 64a,b can maintain interests in each of the communities serviced by respective second processors 53a,b, and each receive separate member client informons 61b,c and 61a,d, respectively.

Each member client 63a–d provides respective member client feedback 65a–d to fourth processor 55, responsive to the proposed member client informons 61a-d. Based upon the member client feedback 65a–d, processor 55 updates at least one of the preprocessing profile 49, community profiles 48a,b and member client profiles 62a–d. Also, processor 55 adapts at least one of the adaptive content profile 68 and the adaptive collaboration profile 69, responsive to profiles 49, 48a,b, and 62a–d.

Fourth processor 55 can include a plurality of adaptive filters 66a–d for each of the aforementioned profiles and computer storage therefor. It is preferred that the plurality of adaptive filters 66a–d be self-optimizing adaptive filters. Self-optimization can be effected according to a preselected self-optimizing adaptation technique including, for example, one or more of a top-key-word-selection adaptation technique, a nearest-neighbor adaptation technique, a term-weighting adaptation technique, and a probabilistic adaptation technique. Any of the adaptive filters 66a–d may include a neural network In one present embodiment of the invention, the term-weighting adaptation technique is preferred to be a TF-IDF technique and the probabilistic adaptation technique is preferred to be a MDL technique.

An artisan would recognize that one or more of the processors 52–55 could be combined functionally so that the actual number of processors used in the apparatus 50 could be less than, or greater than, that illustrated in FIG. 2. For example, in one embodiment of the present invention, first processor 52 can be in a single microcomputer workstation, with processors 53–55 being implemented in additional respective microcomputer systems. Suitable microcomputer systems can include those based upon the Intel® Pentium-Pro™ microprocessor. In fact, the flexibility of design presented by the invention allows for extensive scalability of apparatus 50, in which the number of users, and the communities supported may be easily expanded by adding suitable processors. As described in the context of FIG. 1, the interrelation of the several adaptive profiles and respective filters allow trends attributable to individual member clients, individual users, and individual communities in one domain of system 51 to be recognized by, and influence, similar entities in other domains, of system 51 to the extent that the respective entities in the different domains share common attributes.

Figure 3:
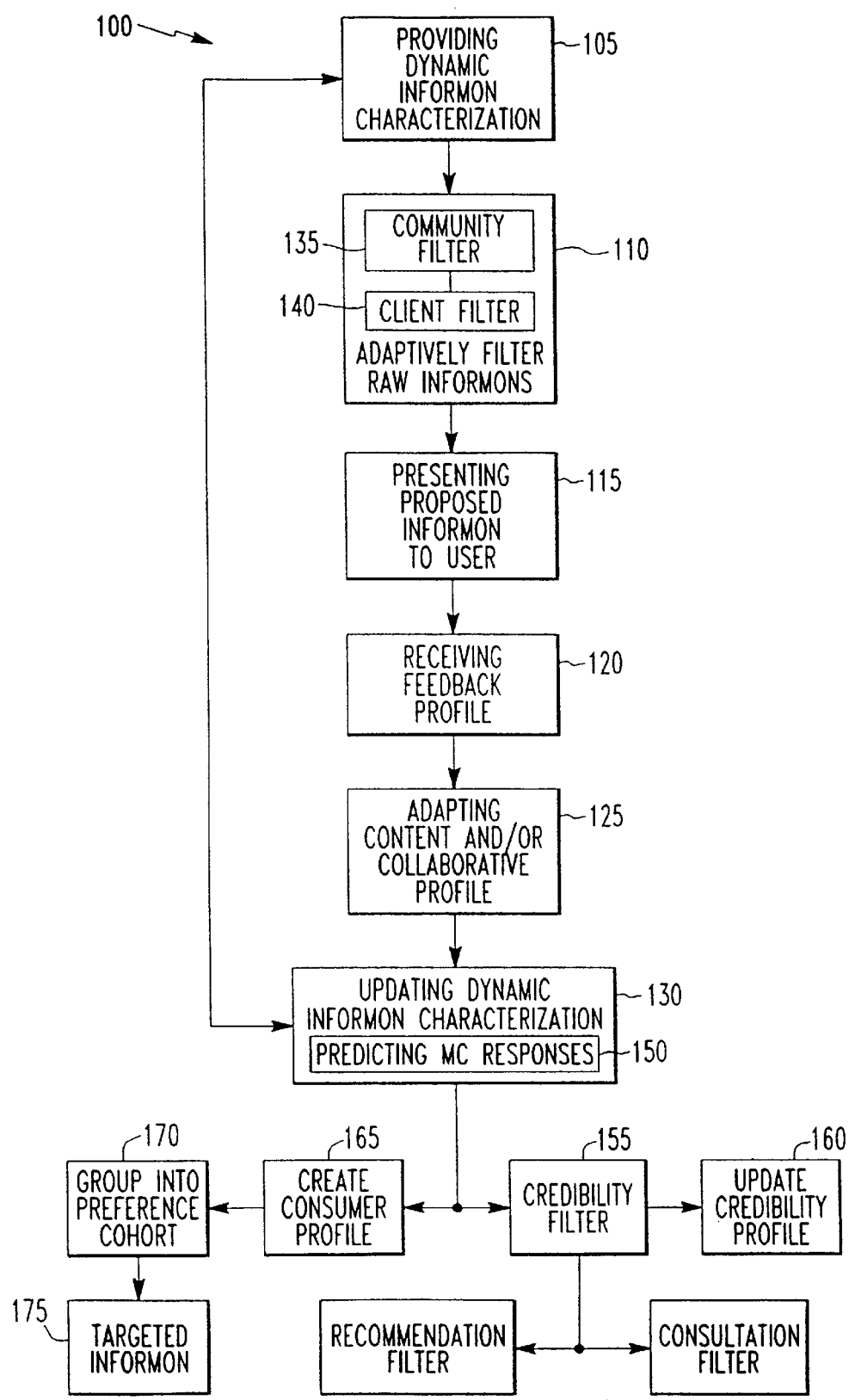
FIG. 3 is a flow diagram for an embodiment of an information filtering method according to the present invention.

The above described system operates in accordance with 100 for information filtering in a computer system, as illustrated in FIG. 3, which includes providing a dynamic informon characterization (step 105) having a plurality of profiles encoded therein, including an adaptive content profile and an adaptive collaboration profile; and adaptively filtering the raw informons (step 110) responsive to the dynamic informon characterization, thereby producing a proposed informon. The method continues by presenting the proposed informon to the user (step 115) and receiving a feedback profile from the user (step 120), responsive to the proposed informon. Also, the method includes adapting at least one of the adaptive content profile (step 125) and the adaptive collaboration profile responsive to the feedback profile; and updating the dynamic informon characterization (step 130) responsive thereto.

The adaptive filtering (step 110) in method 100 can be machine distributed adaptive filtering that includes community filtering (sub-step 135), using a community profile for each community, and client filtering (sub-step 140), similarly using a member client profile for each member client of each community. It is preferred that the filtering in sub-steps 135 and 140 be responsive to the adaptive content profile and the adaptive collaboration profile. Method 100 comprehends servicing multiple communities and multiple of users. In turn, each user may be represented by multiple member clients, with each client having a unique member client profile and being a member of a selected community. It is preferred that updating the dynamic informon characterization (step 130) further include predicting selected subsequent member client responses (step 150).

Method 100 can also include credibility filtering (step 155) of the raw informons responsive to an adaptive credibility profile and updating the credibility profile (step 160) responsive to the user feedback profile. Method 100 further can include creating a consumer profile (step 165) responsive to the user feedback profile. In general, the consumer profile is representative of predetermined consumer preference criteria relative to the communities of which the user is a member client. Furthermore, grouping selected ones (step 170) of the users into a preference cohort, responsive to the preselected consumer preference criteria, can facilitate providing a targeted informon (step 175), such as an advertisement, to the preference cohort.

Figure 4:
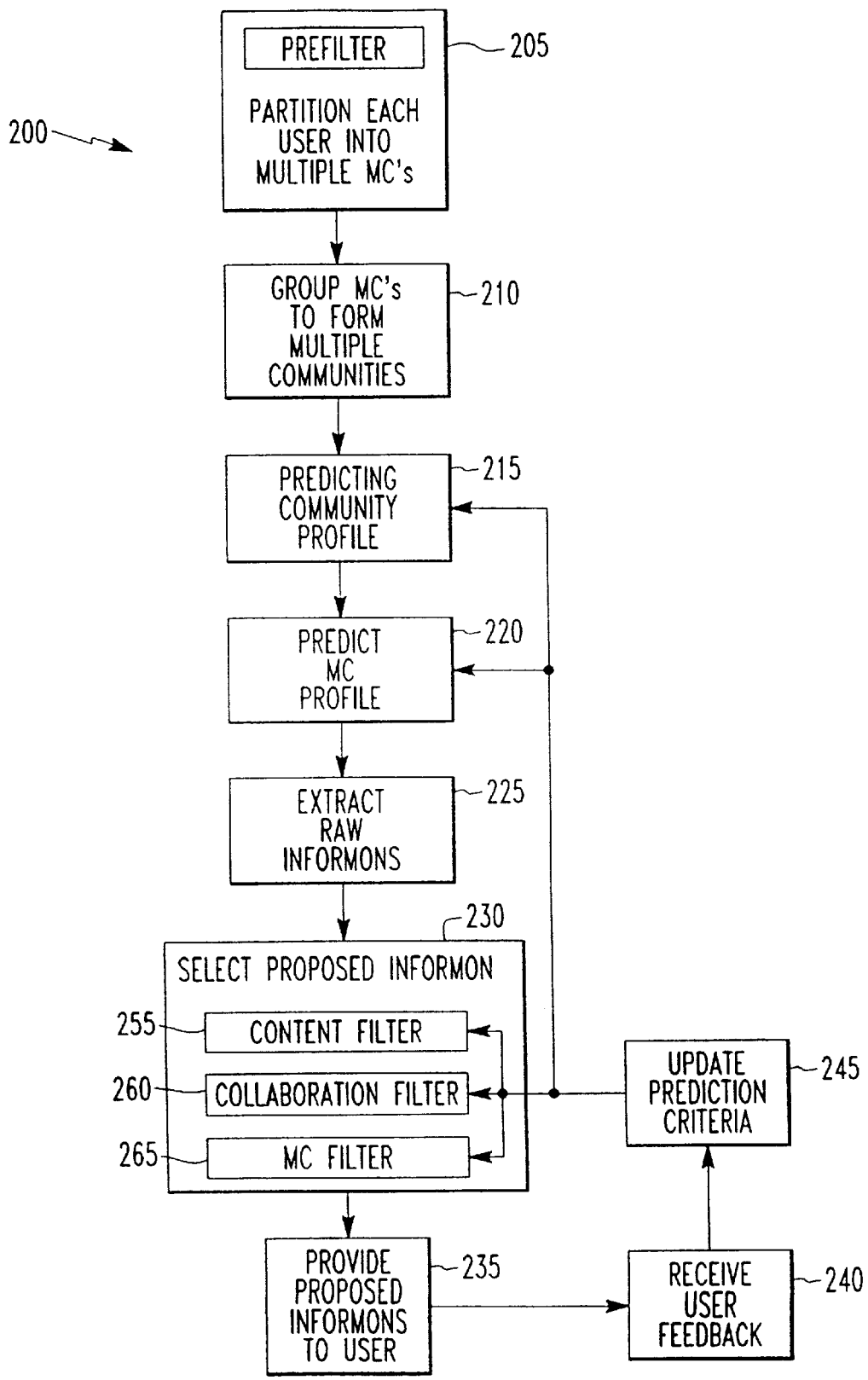
FIG. 4 is a flow diagram for another embodiment of an information filtering method according to the present invention.

FIG. 4 illustrates yet another preferred method 200. In general, method 200 includes partitioning (step 205) each user into multiple member clients, each having a unique member client profile with multiple client attributes and grouping member clients (step 210) to form a multiple communities with each member client in a particular community sharing selected client attributes with other member clients, thereby providing each community with a unique community profile having common client attributes.

Method 200 continues by predicting a community profile (step 215) for each community using first prediction criteria, and predicting a member client profile (step 220) for a member client in a particular community using second prediction criteria. Method 200 also includes the steps of extracting raw informons (step 225) from a data stream and selecting proposed informons (step 230) from raw informons. The proposed informons generally are correlated with one or more of the common client attributes of a community, and of the member client attributes of the particular member client to whom the proposed informon is offered. After providing the proposed informons to the user (step 235), receiving user feedback (step 240) in response to the proposed informons permits the updating of the first and second prediction criteria (step 245) responsive to the user feedback.

Method 200 further may include prefiltering the data stream (step 250) using the predicted community profile, with the predicted community profile identifying the raw informons in the data stream.

Step 230 of selecting proposed informons can include filtering the raw informons using an adaptive content filter (step 255) responsive to the informon content; filtering the raw informons using an adaptive collaboration filter (step 260) responsive to the common client attributes for the pertaining community; and filtering the raw informons using an adaptive member client filter (step 265) responsive to the unique member client profile.

It is preferred that updating the first and second prediction criteria (step 245) employ a self-optimizing adaptation technique, including, for example, one or more of a top-key-word-selection adaptation technique, a nearest-neighbor adaptation technique, a term-weighting adaptation technique, and a probabilistic adaptation technique. It is further preferred that the term-weighting adaptation technique be a TF-IDF technique and the probabilistic adaptation technique be a minimum description length technique.

Figure 5:
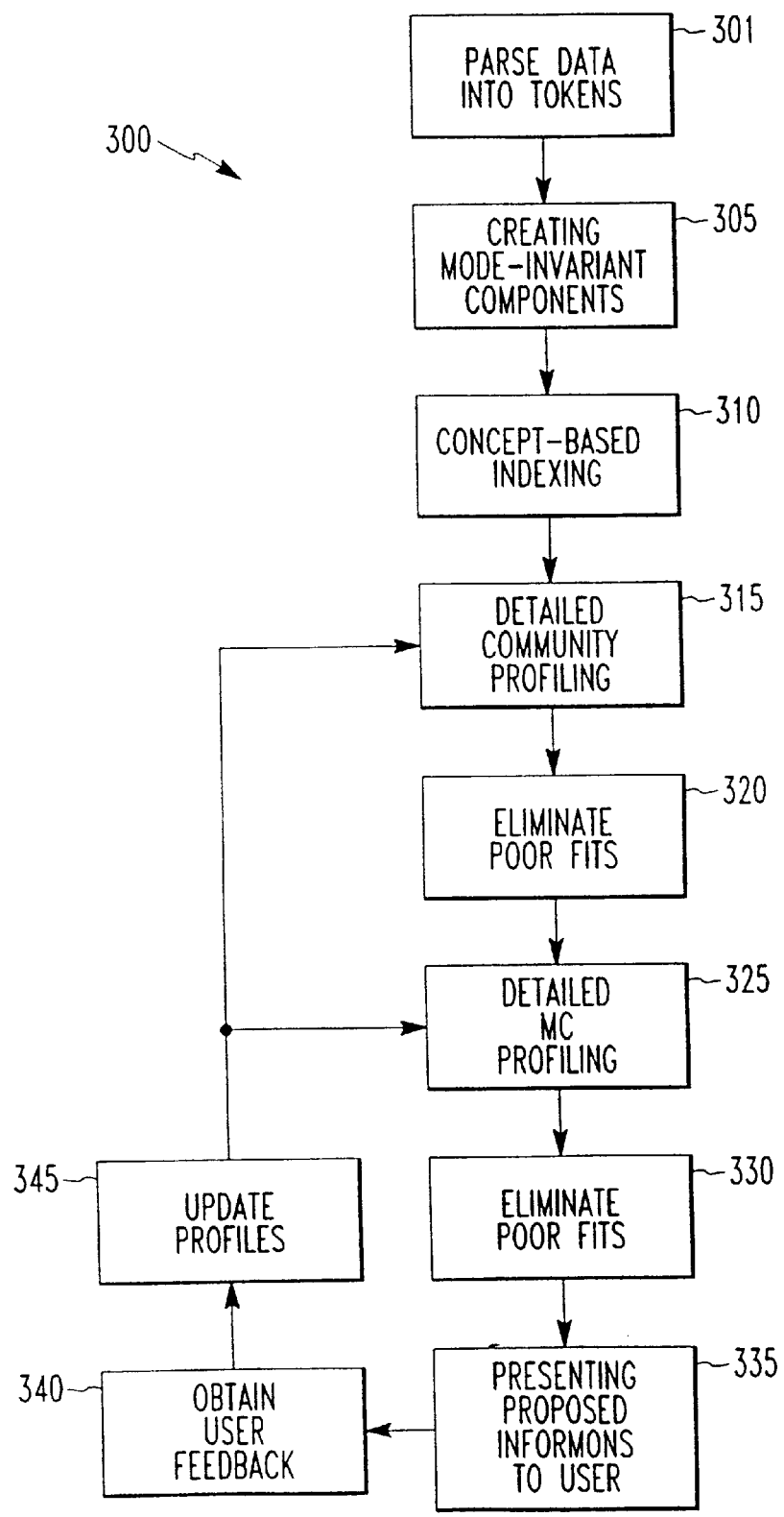
FIG. 5 is a flow diagram for yet another embodiment of an information filtering method according to the present invention.

The information filtering method shown in FIG. 5 provides rapid, efficient data reduction and routing, or filtering, to the appropriate member client. The method 300 includes parsing the data stream into tokens (step 301); creating a mode-invariant (MI) profile of the informon (step 305); selecting the most appropriate communities for each informon, based on the MI profile, using concept-based indexing (step 310); detailed analysis (step 315) of each informon with regard to its fit within each community; eliminating poor-fitting informons (step 320); detailed filtering of each informon relative to fit for each member client (step 325); eliminating poor-fitting informons (step 330); presenting the informon to the member client/user (step 335); and obtaining the member client/user response, including multiple ratings for different facets of the user's response to the informon (step 340).

It is preferred that coherent portions of the data stream, i.e., potential raw informons, be first parsed (step 301) into generalized words, called tokens. Tokens include punctuation and other specialized symbols that may be part of the structure found in the article headers. For example, in addition to typical words such as "seminar" counting as tokens, the punctuation mark "$" and the symbol "Newsgroup:comp.ai" are also tokens. Using noun phrases as tokens also can be useful.

Next a vector of token counts for the document is created. This vector is the size of the total vocabulary, with zeros for tokens not occurring in the document. Using this type of vector is sometimes called the bag-of-words model. While the bag-of-words model does not capture the order of the tokens in the document, which may be needed for linguistic or syntactic analysis, it captures most of the information needed for filtering purposes.

Although, it is common in information retrieval systems to group the tokens together by their common linguistic roots, called stemming, as a next step it is preferred in the present invention that the tokens be left in their unstemmed form. In this form, the tokens are amenable to being classified into mode-invariant concept components.

Creating a mode-invariant profile (step 305), C, includes creating a conceptual representation for each informon, A, that is invariant with respect to the form-of-expression, e.g., vocabulary and conceptualization. Each community can consist of a "Meta-U-Zine" collection, M, of informons. Based upon profile C, the appropriate communities, if any, for each informon in the data stream are selected by concept-based indexing (step 310) into each M. That is, for each concept C that describes A, put A into a queue $Q_M$, for each M which is related to C. It is preferred that there is a list of Ms that is stored for each concept and that can be easily index-searched. Each A that is determined to be a poor fit for a particular M is eliminated from further processing. Once A has been matched with a particular M, a more complex community profile $P_M$ is developed and maintained for each M (step 315). If A has fallen into $Q_M$, then A is analyzed to determine whether it matches $P_M$ strongly enough to be retained or "weeded" out (step 325) at this stage.

Each A for a particular M is sent to each user's personal agent, or member client U of M, for additional analysis based on the member client's profile (step 325). Each A that fits U's interests sufficiently is selected for U's personal informon, or "U-Zine," collection, Z. Poor-fitting informons are eliminated from placement in Z (step 330). This user-level stage of analysis and selection may be performed on a centralized server site or on the user's computer.

Next, the proposed informons are presented to user U (step 335) for review. User U reads and rates each selected A found in Z (step 340). The feedback from U can consist of a rating for how "interesting" U found A to be, as well as one or more of the following:

Opinion feedback: Did U agree, disagree, or have no opinion regarding the position of A?

Credibility Feedback: Did U find the facts, logic, sources, and quotes in A to be truthful and credible or not?

Informon Qualities: How does the user rate the informons qualities, for example, "interestingness," credibility, funniness, content value, writing quality, violence content, sexual content, profanity level, business importance, scientific merit, surprise/unexpectedness of information content, artistic quality, dramatic appeal, entertainment value, trendiness/importance to future directions, and opinion agreement.

Specific Reason Feedback: Why did the user like or dislike A?
Because of the authority?
Because of the source?

Because A is out-of-date (e.g. weather report from 3 weeks ago)?

Because the information contained in A has been seen already? (I.e., the problem of duplicate information delivery)

Categorization Feedback: Did U liked A? Was it placed within the correct M and Z?

Such multi-faceted feedback queries can produce rich feedback profiles from U that can be used to adapt each of the profiles used in the filtering process to some optimal operating point.

One embodiment of creating a MI profile (step 305) for each concept can include concept profiling, creation, and optimization. Broad descriptors can be used to create a substantially-invariant concept profile, ideally without the word choice used to express concept C. A concept profile can include positive concept clues (PCC) and negative concept clues (NCC). The PCC and NCC can be combined by a processor to create a measure-of-fit that can be compared to a predetermined threshold. If the combined effect of the PCC and NCC exceeds the predetermined threshold, then informon A can be assumed to be related to concept C; otherwise it is eliminated from further processing. PCC is a set of words, phrases, and other features, such as the source or the author, each with an associated weight, that tend to be in A which contains C. In contrast, NCC is a set of words, phrases, and other features, such as the source or the author, each with an associated weight that tend to make it more unlikely that A is contained in C. For example, if the term "car" is in A, then it is likely to be about automobiles. However, if the phrase "bumper car" also is in A, then it is more likely that A related to amusement parks. Therefore, "bumper car" would fall into the profile of negative concept clues for the concept "automobile."

Typically, concept profile C can be created by one or more means. First, C can be explicitly created by user U.

Second, C can be created by an electronic thesaurus or similar device that can catalog and select from a set of concepts and the words that can be associated with that concept. Third, C can be created by using co-occurrence information that can be generated by analyzing the content of an informon. This means uses the fact that related features of a concept tend to occur more often within the same document than in general. Fourth, C can be created by the analysis of collections, H, of A that have been rated by one or more U. Combinations of features that tend to occur repeatedly in H can be grouped together as PCC for the analysis of a new concept. Also, an A that one or more U have rated and determined not to be within a particular Z can be used for the extraction of NCC.

Concept profiles can be optimized or learned continually after their creation, with the objective that nearly all As that Us have found interesting, and belonging in M, should pass the predetermined threshold of at least one C that can serve as an index into M. Another objective of concept profile management is that, for each A that does not fall into any of the one or more M that are indexed by C, the breadth of C is adjusted to preserve the first objective, insofar as possible. For example, if C's threshold is exceeded for a given A, C's breadth can be narrowed by reducing PCC, increasing NCC, or both, or by increasing the threshold for C.

In the next stage of filtering, one embodiment of content-based indexing takes an A that has been processed into the set of C that describe it, and determine which M should accept the article for subsequent filtering, for example, detailed indexing of incoming A. It is preferred that a data structure including a database be used, so that the vector of Ms, that are related to any concept C, may be looked-up. Furthermore, when a Z is created by U, the concept clues given by U to the information filter can be used to determine a set of likely concepts C that describe what U is seeking. For example, if U types in "basketball" as a likely word in the associated Z, then all concepts that have a high positive weight for the word "basketball" are associated with the new z. If no such concepts C seem to pre-exist, an entirely new concept C is created that is endowed with the clues U has given as the starting profile.

To augment the effectiveness of concept-based indexing, it is preferred to provide continual optimization learning. In general, when a concept C no longer uniquely triggers any documents that have been classified and liked by member clients U in a particular community M, then that M is removed from the list of M indexed into by C. Also, when there appears to be significant overlap between articles fitting concept C, and articles that have been classified by users as belonging to M, and if C does not currently index into M, then M can be added to the list of M indexed into by C. The foregoing heuristic for expanding the concepts C that are covered by M, can potentially make M too broad and, thus, accept too many articles. Therefore, it further is preferred that a reasonable but arbitrary limit is set on the conceptual size covered by M.

With regard to the detailed analysis of each informon A with respect to the community profile for each M, each A must pass through this analysis for each U subscribing to a particular M, i.e., for each member client in a particular community. After A has passed that stage, it is then filtered at a more personal, member client level for each of those users. The profile and filtering process are very similar for both the community level and the member client level, except that at the community level, the empirical data obtained is for all U who subscribed to M, and not merely an individual U. Other information about the individual U can be used to help the filter, such as what U thinks of what a particular author writes in other Zs that the user reads, and articles that can't be used for the group-level M processing.

Figure 6:
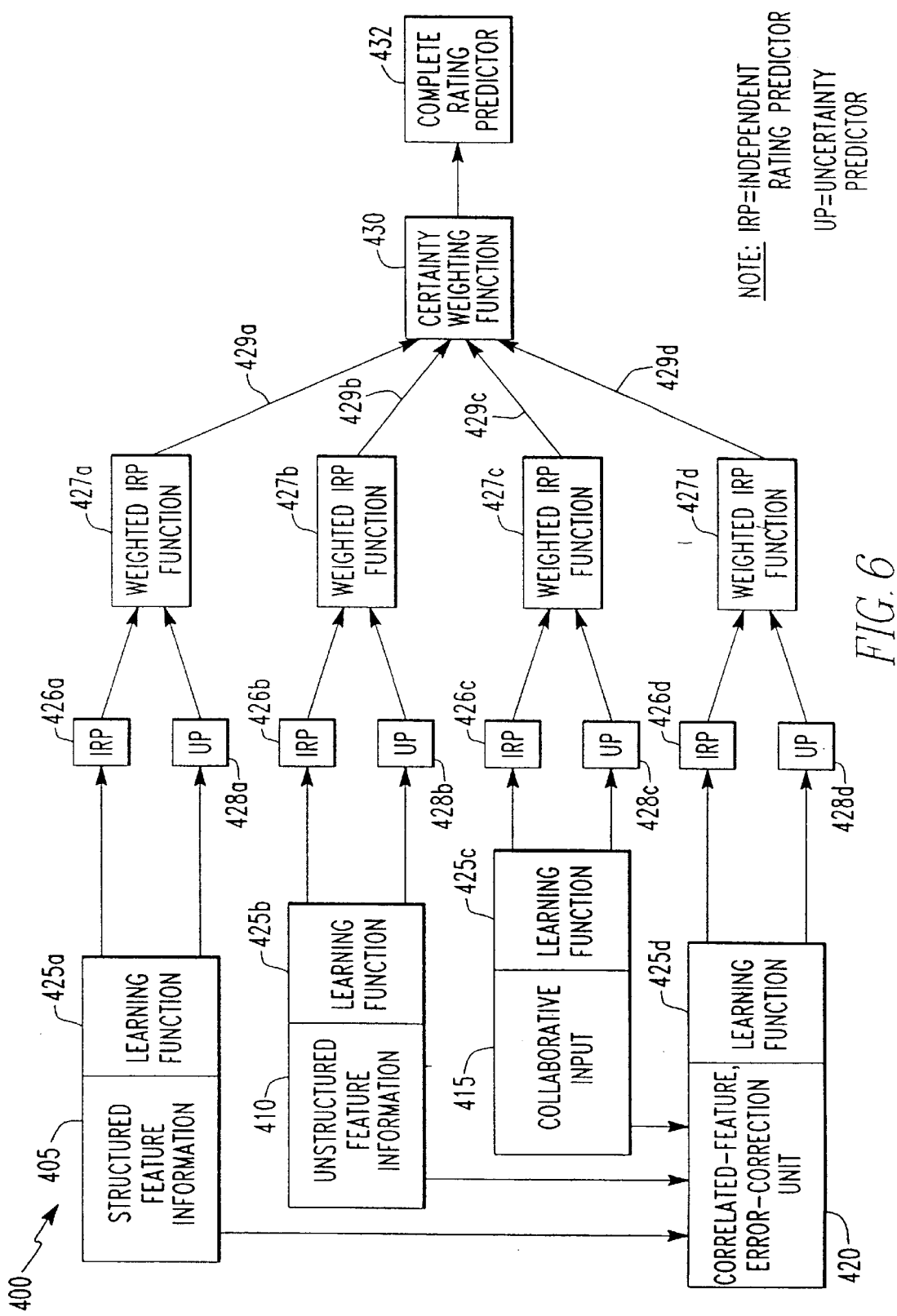
FIG. 6 is an illustration of a three-component-input model and profile with associated predictors.

FIG. 6 illustrates the development of a profile, and its associated predictors. Typically, regarding the structure of a profile 400, the information input into the structure can be divided into three broad categories: (1) Structured Feature Information (SFI) 405; (2) Unstructured Feature Information (UFI) 410; and (3) Collaborative Input (CI) 415. Features derived from combinations of these three types act as additional peer-level inputs for the next level of the rating prediction function, called (4) Correlated-Feature, Error-Correction Units (CFECU) 420. From inputs 405, 410, 415, 420, learning functions 425a–d can be applied to get two computed functions 426a–d, 428a–d of the inputs. These two functions are the Independent Rating Predictors (IRP) 426a–d, and the associated Uncertainty Predictors (UP) 428a–d. IRPs 426a–d can be weighted by dividing them by their respective UPs 428a–d, so that the more certain an IRP 426a–d is, the higher its weight. Each weighted IRP 429a–d is brought together with other IRPs 429a–d in a combination function 427a–d. This combination function 427a–d can be from a simple, weighted, additive function to a far more complex neural network function. The results from this are normalized by the total uncertainty across all UPs, from Certain=zero to Uncertain=infinity, and combined using the Certainty Weighting Function (CWF) 430. Once the CWF 430 has combined the IRPs 426a–d, it is preferred that result 432 be shaped via a monotonically increasing function, to map to the range and distribution of the actual ratings. This function is called the Complete Rating Predictor (CRP) 432.

SFI 405 can include vectors of authors, sources, and other features of informon A that may be influential in determining the degree to which A falls into the categories in a given M. UFI 410 can include vectors of important words, phrases, and concepts that help to determine the degree to which A falls into a given M. Vectors can exist for different canonical parts of A. For example, individual vectors may be provided for subject/headings, content body, related information in other referenced informons, and the like. It is preferred that a positive and negative vector exists for each canonical part.

CI 415 is received from other Us who already have seen A and have rated it. The input used for CI 415 can include, for example, "interestingness," credibility, funniness, content value, writing quality, violence content, sexual content, profanity level, business importance, scientific merit, surprise/unexpectedness of information content, artistic quality, dramatic appeal, entertainment value, trendiness/importance to future directions, and opinion agreement. Each CFECU 420 is a unit that can detect sets of specific feature combinations which are exceptions in combination. For example, author X's articles are generally disliked in the Z for woodworking, except when X writes about lathes. When an informon authored by X contains the concept of "lathes," then the appropriate CFECU 420 is triggered to signal that this is an exception, and accordingly a signal is sent to offset the general negative signal otherwise triggered because of the general dislike for X's informons in the woodworking Z.

As an example the form of Structured Feature Information (SFI) 405 can include fields such as Author, Source, Information-Type, and other fields previously identified to be of particular value in the analysis. For simplicity, the exemplary SFI, below, accounts only for the Author field. For this example, assume three authors A, B, and C, have collectively submitted 10 articles that have been read, and have been rated as in TABLE 1 (following the text of this specification. In the accompanying rating scheme, a rating can vary between 1 and 5, with 5 indicating a "most interesting" article. If four new articles (11, 12, 13, 14) arrive that have not yet been rated, and, in addition to authors A, B, C, and a new author D has contributed, a simple IRP for the Author field, that just takes sums of the averages, would be as follows:

IRP(author)=weighted sum of
    average(ratings given the author so far)
    average(ratings given the author so far in this M)
    average(ratings given all authors so far in this M)
    average(ratings given all authors)
    average(ratings given the author so far by a particular user U)*
    average(ratings given the author so far in this M by a particular user U)*
    average(ratings given all authors so far in this M by a particular user U)*
    average(ratings given all authors by a particular user)*

* (if for a personal Z)

The purpose of the weighted sum is to make use of broader, more general statistics, when strong statistics for a particular user reading an informon by a particular author, within a particular Z may not yet be available. When stronger statistics are available, the broader terms can be eliminated by using smaller weights. This weighting scheme is similar to that used for creating CWFs 430, for the profiles as a whole. Some of the averages may be left out in the actual storage of the profile if, for example, an author's average rating for a particular M is not "significantly" different from the average for the author across all Ms. Here, "significance" is used is in a statistical sense, and frameworks such as the Minimum Description Length (MDL) Principle can be used to determine when to store or use a more "local" component of the IRP. As a simple example, the following IRP employs only two of the above terms:

IRP(author)=weighted sum of
    average (ratings given this author so far in this M)
    average (ratings given all authors so far in this M)

Table 2 gives the values attained for the four new articles.

It is preferred that an estimate of the uncertainty resulting from a positive or negative IRP be made, and a complex neural net approach could be used. However, a simpler method, useful for this example, is simply to repeat the same process that was used for the IRP but, instead of predicting the rating, it is preferred to predict the squared-error, given the feature vector. The exact square-error values can be used as the informon weights, instead of using a rating-weight lookup table. A more optimal mapping function could also be computed, if indicated by the application.

|  | Token 1 | Token 2 | Token 3 | Token 4 |
|---|---|---|---|---|
| IRP pos. vector | 16.68 | 8.73 | 12.89 | 11.27 |
| IRP neg. vector | 15.20 | 8.87 | 4.27 | 5.04 |

The UPs then can be computed in a manner similar to the IRP's: comparisons with the actual document vectors can be made to get a similarity measure, and then a mapping function can be used to get an UP.

Making effective use of collaborative input (CI) from other users U is a difficult problem because of the following seven issues. First, there generally is no a priori knowledge regarding which users already will have rated an informon A, before making a prediction for a user U, who hasn't yet read informon A. Therefore, a model for prediction must be operational no matter which subset of the inputs happen to be available, if any, at a given time. Second, computational efficiency must be maintained in light of a potentially very large set of users and informons. Third, incremental updates of rating predictions often are desired, as more feedback is reported from users regarding an informon. Fourth, in learning good models for making rating predictions, only very sparse data typically is available for each users rating of each document. Thus, a large "missing data" problem must be dealt with effectively.

Fifth, most potential solutions to the CI problem require independence assumptions that, when. grossly violated, give very poor results. As an example of an independence assumption violation, assume that ten users of a collaborative filtering system, called the "B-Team," always rate all articles exactly in the same way, for example, because they think very much alike. Further assume that user A's ratings are correlated with the B-Team at the 0.5 level, and are correlated with user C at the 0.9 level. Now, suppose user C reads an article and rates it a "5". Based on that C's rating, it is reasonable to predict that A's rating also might be a "5". Further, suppose that a member of the B-Team reads the article, and rates it a "2". Existing collaborative filtering methods are likely to predict that A's rating RA would be:

$$R_A=(0.9\times5+0.5\times2)/(0.9+0.5)=3.93$$

In principle, if other members of the B-Team then read and rate the article, it should not affect the prediction of A's rating, $R_A$, because it is known that other B-Team members always rate the article with the same value as the first member of the B-Team. However, the prediction for A by existing collaborative filtering schemes would tend to give 10 times the weight to the "2" rating, and would be:

$$R_A=(0.9\times5+10\times0.5\times2)/(0.9+10\times0.5)=2.46$$

Existing collaborative filtering schemes do not work well in this case because B-Team's ratings are not independent, and have a correlation among one another of 1. The information filter according to the present invention can recognize and compensate for such inter-user correlation.

Sixth, information about the community of people is known, other than each user's ratings of informons. This information can include the present topics the users like, what authors the users like, etc. This information can make the system more effective when it is used for learning stronger associations between community members. For example, because Users A and B in a particular community M have never yet read and rated an informon in common, no correlation between their likes and dislikes can be made, based on common ratings alone. However, users A and B have both read and liked several informons authored by the same author, X, although Users A and B each read a distinctly different Zs. Such information can be used to make the inference that there is a possible relationship between user A's interests and user B's interests. For the most part, existing collaborative filtering systems can not take advantage of this knowledge.

Seventh, information about the informon under consideration also is known, in addition to the ratings given it so far. For example, from knowing that informon A is about the concept of "gardening", better use can be made of which users' ratings are more relevant in the context of the information in the informon. If user B's rating agrees with user D's rating of articles when the subject is about "politics", but B's ratings agree more with user D when informon A is about "gardening", then the relationship between User B's ratings and User D's ratings are preferred to be emphasized to a greater extent than the relationship between User B and User C when making predictions about informon A.

With regard to the aforementioned fourth, sixth and seventh issues namely, making effective use of sparse, but known, information about the community and the informon, it is possible to determine the influence of user A's rating of an informon on the predicted rating of the informon for a second user, B. For example, where user A and user B have read and rated in common a certain number of informons, the influence of user A's rating of informon D on the predicted rating of informon D for user B can be defined by a relationship that has two components. First, there can be a common "mindset," $S_M$ between user A and user B and informon D, that may be expressed as:

$$M_S=\text{profile}(A) \times \text{profile}(B) \times \text{DocumentProfile}(D).$$

Second, a correlation may be taken between user A's past ratings and user B's past ratings with respect to informons that are similar to D. This correlation can be taken by weighting all informons E that A and B have rated in common by the similarity of E to D, $S_{ED}$:

$$S_{ED}=\text{Weighted\_Correlation}(\text{ratings}(A),\text{ratings}(B))$$

Each of the examples can be weighted by $$W_{pr} = \text{weight for rating pair (rating }(A, D)\text{, rating }(B, D))$$
$$= DocumentProfile (E) \times DocumentProfile(D)$$

Note that the "X" in the above equation may not be a mere multiplication or cross-product, but rather be a method for comparing the similarity between the profiles. Next, the similarity of the member client profiles and informon content profiles can be compared. A neural network could be used to learn how to compare profiles so that the error in predicted ratings is minimized. However, the invention can be embodied with use of a simple cosine similarity metric, like that previously considered in connection with Unstructured Feature Information (UFI) can be used.

The method used is preferred to be able to include more than just the tokens, such as the author and other SFI; and, it is preferred that the three vectors for component also are able to be compared. SFIs may be handled by transforming them into an entity that can be treated in a comparable way to token frequencies that can be multiplied in the standard token frequency comparison method, which would be recognized by a skilled artisan.

Continuing in the ongoing example, the Author field may be used. Where user A and user B have rated authors K and L, the token frequency vector may appear as follows:

| User | Avg. Rating Given to Author K | # in sample | Avg. Rating Given to Author L | # in sample | Avg. Rating Given to Author M | # in sample |
| --- | --- | --- | --- | --- | --- | --- |
| A | 3.1 | 21 | 1.2 | 5 | N/A | 0 |
| B | 4 | 1 | 1.3 | 7 | 5 | 2 |

Further, the author component of the member client profiles of user A and user B may be compared by taking a special weighted correlation of each author under comparison. In general, the weight is a function F of the sample sizes for user A's and user B's rating of the author, where F is the product of a monotonically-increasing function of the sample size for each of user A and user B. Also, a simple function G of whether the informon D is by the author or not is used. This function can be: G=q if so, and G=p<q if not, where p and q are optimized constraints according to the domain of the filtering system. When there has been no rating of an author by a user, then the function of the zero sample size is positive. This is because the fact that the user did not read anything by the author can signify some indication that the author might not produce an informon which would be highly rated by the user. In this case, the exact value is an increasing function H of the total articles read by a particular user so far, because it becomes more likely that the user is intentionally avoiding reading informons by that author with each subsequent article that has been read but is not prepared by the author. In general, the exact weighting function and parameters can be empirically derived rather than theoretically derived, and so is chosen by the optimization of the overall rating prediction functions. Continuing in the present example, a correlation can be computed with the following weights for the authors K, L and M.

| Author | Weight |
| --- | --- |
| K | F(21,1,not author) |
| | = log(21 + 1) × log(1 + 1) × G(not author) |
| | = 0.04 |
| L | F(5,7, author or D) |
| | = log(5 + 1) × log(7 + 1) × G(author) |
| | = 0.70 |

-continued

| Author | Weight |
|--------|--------|
| M | F(0.2, not author) |
|   | = H(26) × log(2 + 1) × G(not author) |
|   | = 0.02 |

It is preferred that the logarithm be used as the monotonically-increasing function and that p=1, q=0.1. Also used are H=log(sample$_{size}$*0.1) and an assumed rating, for those authors who are unrated by a user, to the value of "2." The correlation for the author SFI can be mapped to a non-zero range, so that it can be included in the cosine similarity metric. This mapping can be provided by a simple one-neuron neural network, or a linear function such as, (correlation+1)*P$_0$. Where the P$_0$ is an optimized parameter used to produce the predicted ratings with the lowest error in the given domain for filtering.

An artisan skilled in information retrieval would recognize that there are numerous methods that can be used to effect informon comparisons, particularly document comparisons. One preferred method is to use a TF-IDF weighting technique in conjunction with the cosine similarity metric. SFI including author, can be handled by including them as another token in the vector. However, the token is preferred to be weighted by a factor that is empirically optimized rather than using a TF-IDF approach. Each component of the relationship between user A's and user B's can be combined to produce the function to predict the rating of informon D for user B. The combination function can be a simple additive function, a product function, or a complex function, including, for example, a neural network mapping function, depending upon computational efficiency constraints encountered in the application. Optimization of the combination function can be achieved by minimizing the predicted rating error as an objective.

In addition to determining the relationship between two user's ratings, a relationship that can be used and combined across a large population of users can be developed. This relationship is most susceptible to the aforementioned first, second, third, and fifth issues in the effective use of collaborative input. Specifically, the difficulty with specifying a user rating relationship across a large population of users is compounded by the lack of a priori knowledge regarding a large volume of dynamically changing information that may have unexpected correlation and therefore grossly violate independence assumptions.

In one embodiment of the present invention, it is preferred that users be broken into distributed groups called "mindpools." Mindpools can be purely hierarchical, purely parallel, or a combination of both. Mindpools can be similar to the aforementioned "community" or may instead be one of many subcommunities. These multiple hierarchies can be used to represent different qualities of an article. Some qualities that can be maintained in separate hierarchies include: interestingness; credibility; funniness; valuableness; writing quality; violence content; sexual content; profanity level; business importance; scientific merit; artistic quality; dramatic appeal; entertainment value; surprise or unexpectedness of information content; trendiness or importance to future directions; and opinion agreement. Each of these qualities can be optionally addressed by users with a rating feedback mechanism and, therefore, these qualities can be used to drive separate mind pool hierarchies. Also, the qualities can be used in combinations, if appropriate, to develop more complex composite informon qualities, and more sublime mindpools.

Figure 7:
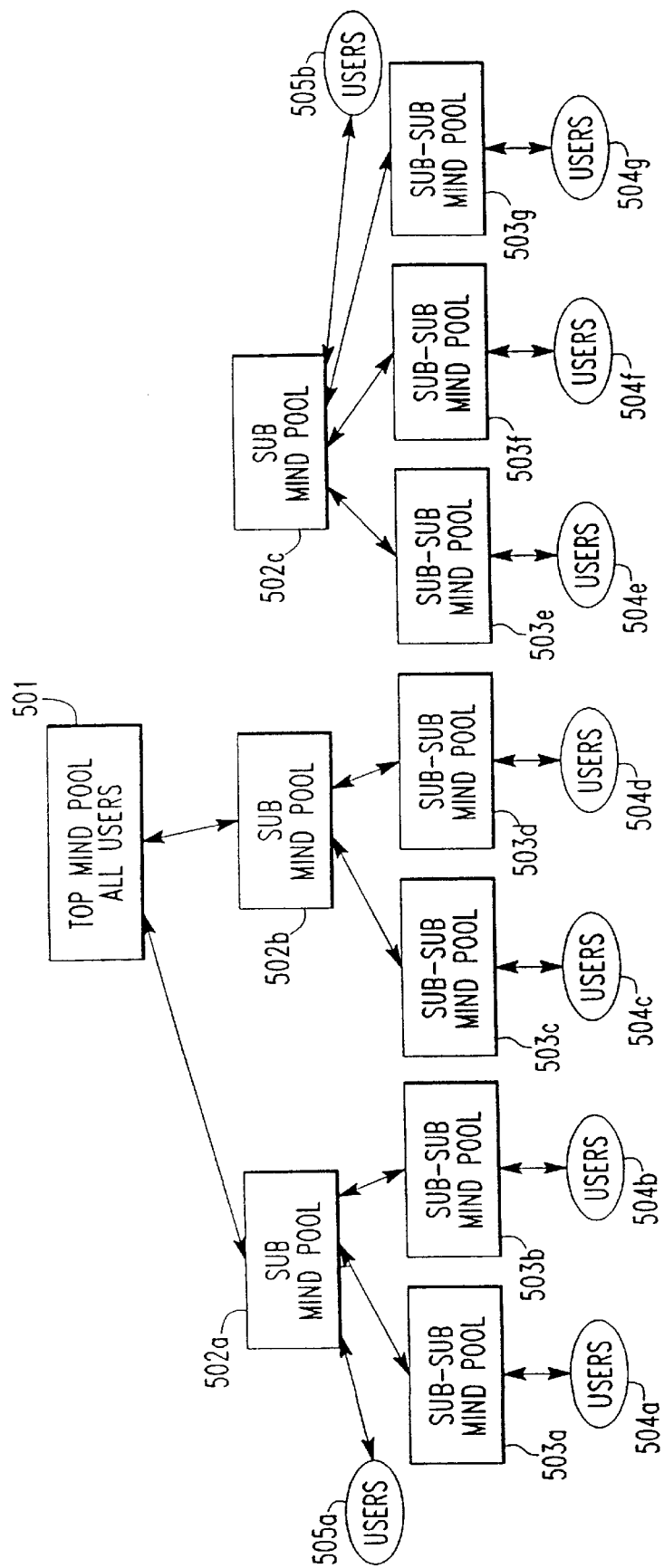
FIG. 7 is an illustration of a mind pool hierarchy.

FIG. 7 illustrates a preferred embodiment of a mind pool system 500. It is preferred that all users be members of the uppermost portion of the hierarchy, namely, the top mind pool 501. Mind pool 501 can be broken into sub-mindpools 502a–c, which separate users into those having at least some common interests. Furthermore, each sub-mind pool 502a–c can be respectively broken into sub-sub-mindpools 503a–b, 503c–d, 503e,f,g to which users 504a–g are respective members. As used herein, mind pool 501 is the parent node to sub-mindpools 502a–c,and sub-mindpools 502a–c are the respective parent nodes to sub-sub-mindpools 503a–g. Sub-pools 502a–c are the child nodes to mind pool 501 and sub-pools 503a–g are child nodes to respective mindpools 503a–c. Sub-pools 503a–g can be considered to be end nodes. Users 505a,b can be members of sub-mind pool 502a, 502c, if such more closely matches their interests than would membership in a sub-sub-mind pool 503a–g. In general, the objective is to break down the entire population of users into subsets that are optimally similar. For example, the set of users who find the same articles about "gardening" by author A to be interesting but nevertheless found other articles by author A on "gardening" to be uninteresting may be joined in one subset.

A processing means or mind pool manager may be used to handle the management of each of the mindpools 501, 502a–c, and 503a–g. A mind pool manager performs the following functions: (1) receiving rating information from child-node mind pool managers and from those users coupled directly to the manager; (2) passing rating information or compiled statistics of the rating information up to the manager's parent node, if such exists; (3) receiving estimations of the mind pool consensus on the rating for an informon from the manager's parent mind pool, if such exists; and (4) making estimations of the mind pool consensus on the rating for a specific informon for the users that come under the manager's domain; and (5) passing the estimations from function 4 down to either a child-node mind pool or, if the manager is an end node in the hierarchy, to the respective user's CWF, for producing the user's predicted rating. Function 4 also can include combining the estimations received from the manager's parent node, and Uncertainty Predictions can be estimated based on sample size, standard deviation, etc. Furthermore, as alluded to above, users can be allowed to belong to more than one mind pool if they don't fit precisely into one mind pool but have multiple views regarding the conceptual domain of the informon. Also, it is preferred that lateral communication be procided between peer managers who have similar users beneath them to share estimation information. When a rating comes in from a user, it can be passed to the immediate manager(s) node above that user. It is preferred that the manager(s) first decide whether the rating will effect its current estimation or whether the statistics should be passed upward to a parent-node. If the manager estimation would change by an amount above an empirically-derived minimum threshold, then the manager should pass that estimation down to all of its child-nodes. In the event that the compiled statistics are changed by more than another minimum threshold amount, then the compiled statistics should be passed to the manager's parent-node, if any ,and the process recurses upward and downward in the hierarchy.

Because no mind pool manager is required to have accurate information, but just an estimation of the rating and an uncertainty level, any manager may respond with a simple average of all previous documents, and with a higher degree of uncertainty, if none of its child-nodes has any rating information yet. The preferred distributed strategy tends to reduce the communication needed between processors, and the computation tends to be pooled, thereby eliminating a substantial degree of redundancy. Using this distributed strategy, the estimations tend to settle to the extent that the updating of other nodes, and the other users predictions are minimized. Therefore, as the number of informons and users becomes large, the computation and prediction updates grow as the sum of the number of informons and the number of users, rather than the product of the number of informons and the number of users. In addition, incremental updates can be accomplished by the passing of estimations up and down the hierarchy. Incremental updates of rating predictions continue to move until the prediction becomes stable due to the large sample size. The distributed division of users can reduce the effects of independent assumption violations. In the previous example with the B-Team of ten users, the B-Team can be organized as a particular mind pool. With the additional ratings from each of the B-Team members, the estimation from the B-Team mind pool typically does not change significantly because of the exact correlation between the members of that mind pool. This single estimation then can be combined with other estimations to achieve the desired result, regardless of how many B-Team members have read the article at any given time.

The mind pool hierarchies can be created by either computer- or human-guided methods. If the hierarchy creation is human-guided, there often is a natural breakdown of people based on information such as job position, common interests, or any other information that is known about them. Where the mind pool hierarchy is created automatically, because the previously described measure of the collaborative input relationship between users can be employed in a standard hierarchical clustering algorithm to produce each group of users or nodes in the mind pool hierarchy. Such standard hierarchical clustering algorithms can include, for example, the agglomerative method, or the divide-and-conquer method. A skilled artisan would recognize that many other techniques also are available for incrementally-adjusting the clusters as new information is collected. Typically, clustering is intended to (1) bring together users whose rating information is clearly not independent; and (2) produce mind pool estimations that are substantially independent among one another.

Estimations are made in a manner similar to other estimations described herein. For example, for each user or sub-mind pool (sub-informant), a similarity between the sub-informant and the centroid of the mind pool can be computed in order to determine how relevant the sub-informant is in computing the estimation. Uncertainty estimators also are associated with these sub-informants, so that they can be weighted with respect to their reliability in providing the most accurate estimation. Optionally, the informon under evaluation can be used to modulate the relevancy of a sub-informant. This type of evaluation also can take advantage of the two previously-determined collaborative information relationship components, thereby tending to magnify relationships that are stronger for particular types of informons than for others. Once a suitable set of weights are established for each user within a mind pool for a particular informon, a simple weighted-average can be used to make the estimation. It is preferred that the "simple" weighted average used is more conservative regarding input information that a simple independent linear regression. Also, the overall Uncertainty can be derived from the Uncertainty Predictions of the sub-informants, in a manner similar to the production of other uncertainty combination methods described above. Approximations can be made by pre-computing all terms that do not change significantly, based on the particular informon, or the subset of actual ratings given so far to the mind pool manager.

As stated previously, the correlated-feature error-correction units (CFECUs) are intended to detect irregularities or statistical exceptions. Indeed, two objectives of the CFECU units are to (1) find non-linear exceptions to the general structure of the three aforementioned types of inputs (SFI, UFI, and CI); and (2) find particular combinations of informon sub-features that statistically stand out as having special structure which is not captured by the rest of the general model; and (3) trigger an additional signal to the CFECU's conditions are met, in order to reduce prediction error. The following exemplifies the CFECU operation.

|  | User B's Avg. Rating of of Informons About | |
|---|---|---|
|  | Gardening | Politics |
| Author A's Articles | 4.5 | 1.2 |
| Other Authors | 1.4 | 2 |
| Weighted by Topic | 1.68 | 1.87 |

|  | User B's number of Informons Read About | | Average over |
|---|---|---|---|
|  | Gardening | Politics | Topics |
| Author A's Articles | 7 | 40 | 1.69 |
| Other Authors | 70 | 200 | 1.84 |

In this example, it is desired that author A's informon D about gardening have a high predicted rating for user B. However, because the average rating for author A by user B is only 1.69, and the average rating for the gardening concept is only 1.68, a three-part model (SFI-UFI-CI) that does not evaluate the informon features in combination would tend to not rank informon D very highly. In this case, the first CFECU would first find sources of error in past examples. This could include using the three-part model against the known examples that user B has rated so far. In this example, seven articles that user B has rated, have an average rating of 4.5, though even the three-part model only predicts a rating of about 1.68. When such a large error appears, and has statistical strength due to the number of examples with the common characteristics of, for example, the same author and topic, a CFECU is created to identify that this exception to the three-part model has been triggered and that a correction signal is needed. Second, it is preferred to index the new CFECU into a database so that, when triggering features appear in an informon, for example, author and topic, the correction signal is sent into the appropriate CWF. One method which can be used to effect the first step is a cascade correlation neural network, in which the neural net finds new connection neural net units to progressively reduce the prediction error. Another method is to search through each informon that has been rated but whose predicted rating has a high error, and storing the informons profile.

When "enough" informons have been found with high error and common characteristics, the common characteristics can be joined together as a candidate for a new CFECU. Next, the candidate can be tested on all the samples, whether they have a high prediction or a low prediction error associated with them. Then, the overall error change (reduction or increase) for all of the examples can be computed to determine if the CFECU should be added to the informon profile. If the estimated error reduction is greater than a minimum threshold level, the CFECU can be added to the profile. As successful CFECU are discovered for users'profiles, they also can be added to a database of CFECU's that may be useful for analyzing other profiles. If a particular CFECU has a sufficiently broad application, it can be moved up in the filtering process, so that it is computed for every entity once. Also, the particular CFECU can be included in the representation that is computed in the pre-processing stage as a new feature. In general, the estimation of the predicted rating from a particular CFECU can be made by taking the average of those informons for which the CFECU responds. Also, the Uncertainty can be chosen such that the CFECU signal optimally outweighs the other signals being sent to the CWF. One method of self-optimization that can be employed is, for example, the gradient descent method, although a skilled artisan would recognize that other appropriate optimization methods may be used.

Figure 8:
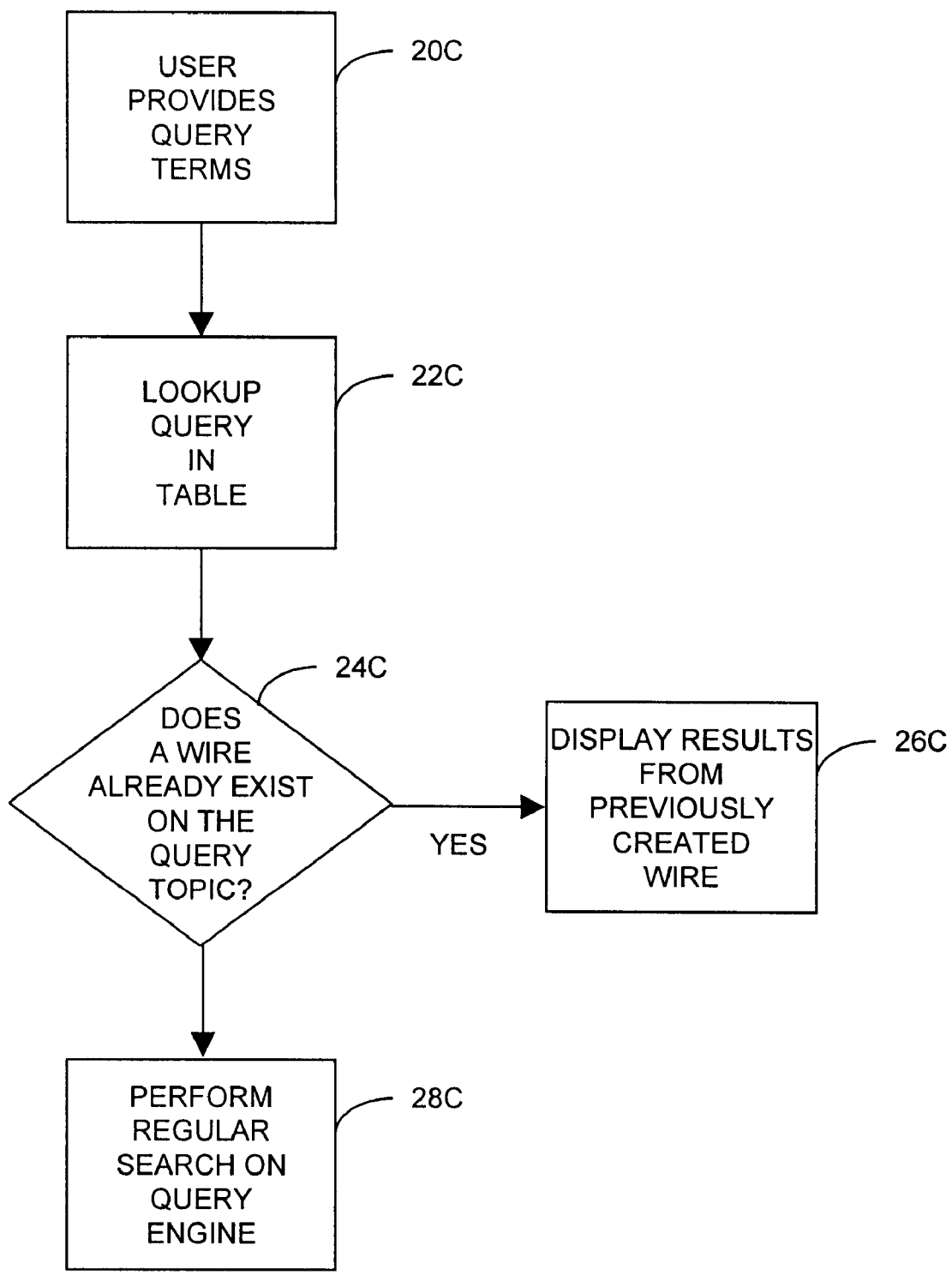
FIG. 8 is a logic diagram illustrating a search selection feature of the invention.
Figure 9:
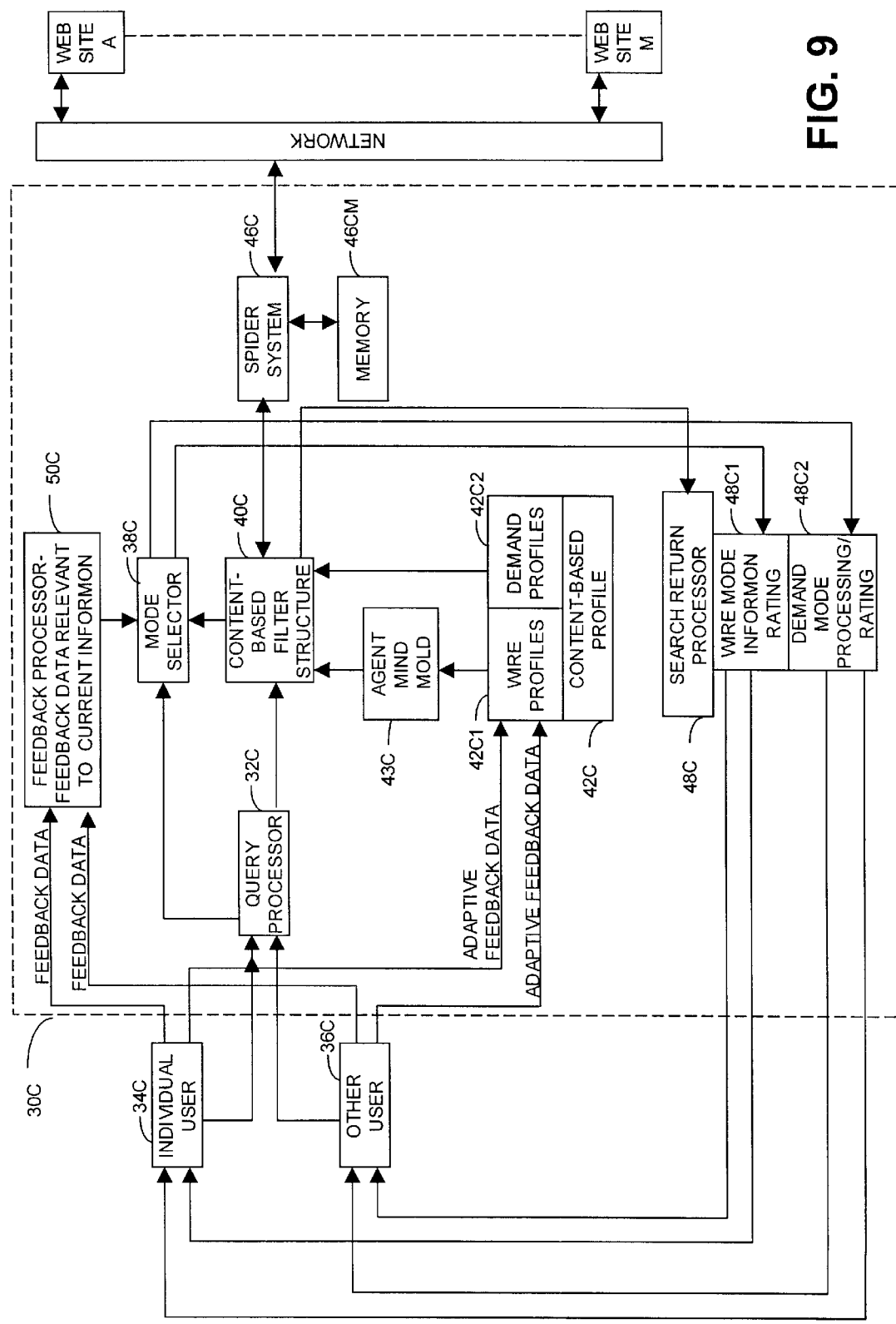
FIG. 9 is a functional block diagram of an embodiment of the invention in which an integrated information processing system employs a search engine and operates with combined collaborative filtering and content-based filtering, which is preferably adaptive, to develop responses to user queries.

The invention of this continuation-in-part application, as shown in FIGS. 8 and 9, provides a collaborative and preferably adaptive search engine system in which elements of the structure and principles of operation of the apparatus of FIGS. 1–7 are applied. Accordingly, a search engine system of the invention, as preferably embodied, integrates collaborative filtering with adaptive content-based filtering to provide improved search engine performance. The acronym "CASE" refers to a search engine system of the invention, i.e., a collaborative, adaptive search engine.

In the operation of conventional search engines at portal web sites., user queries are searched on demand to find relevant informons across the web. Content-based filtering is typically used in measuring the relevacy of informons, and the search results are resented in the form of a list of informons ranked by relevancy.

The present invention combines collaborative filtering with content-based filtering in measuring informons for relevancy, and further preferably applies adaptive updating of the content-based filtering operation. In providing these results, the invention can be embodied as a search engine system in accordance with different basic structures. In the presently preferred basic structure, an integrated collaborative/content-based filter (FIGS. 1–7) is operated to provide ongoing or continuous searching for selected user queries, with a "wire" being established for each query. On the other hand, a regular search engine is operated to make immediate or short-term "demand" searches for other user queries on the basis of content-based filtering. This basic structure of the invention is especially beneficial for use in applying the invention to existing search engine structure.

Demand search results can be returned if no wire exists for an input query. Otherwise, wire search results are returned if a wire does exist, or collaborative ranking data can be applied from the wire filter structure to improve the results of the demand search from the regular search engine.

In the currently preferred embodiment, wires are created for the most common queries received by the search engine system. A suitable analysis is applied to the search engine operations to determine which queries are most common, and respective wires are then created for each of these queries. An analysis update can be made from time to time to make wire additions or deletions as warranted.

When a user makes a query for which a wire already exists, wire search results are preferably returned instead of regular search engine results. As shown in the logic diagram of FIG. 7, a user provides a query as indicated by block 20C. The query is applied to a Lookup Table, as indicated by block 22C, block 24C applies a test to determine from the table whether a wire already exists for the new query. If so, block 26C returns results from the existing wire. Otherwise, block 28C commands a demand search by a regular query engine.

With the use of wire search returns, each user can review the returned results and provide feedback data about reviewed documents. Such feedback data is incorporated in the filter profiles used in processing informons for the wire. Therefore, when a future user makes substantially the same query, the wire will have been improved by the incorporation of previous users' feedback data. By analyzing documents which users rate as meeting a particular quality such as interestingness, the system can find common document features which can be used to return more like documents to future users who make substantially the same query.

Alternatively, all queries applied to a search engine system of the invention can set up new wires. After a search query is presented to the search engine system, a wire is created on the basis of the query terms, and all new documents subsequently received from the network are filtered by the new wire. A push-model may be used to send all passed, new documents to the user.

Among other basic search engine system structures, an integrated system can be employed in which collaborative and content-based filtering is structured to provide demand searches with or without collaborative filtering, or wire searches. In the operation of the preferred basic structure and other basic structures, a query processor can be employed, if needed, to make search-type assignments for user queries. Generally, basic search engine system structures of the invention are preferably embodied with the use of a programmed computer system.

Collaborative filtering employs additional data from other users to improve search results for an individual user for whom a search is being conducted. The collaborative data can be feedback informon rating data, and/or it can be content-profile data for agent mind melding which is more fully disclosed in Ser. No. 09/195,708 now pending, entitled INTEGRATED COLLABORATIVE/CONTENT-BASED FILTER STRUCTURE EMPLOYING SELECTIVELY SHARED, CONTENT-BASED PROFILE DATA TO EVALUATE INFORMATION ENTITIES IN A MASSIVE INFORMATION NETWORK, filed by the current inventors on Nov. 19, 1998, and hereby incorporated by reference.

Many types of user rating information can be used. For example, users can sort documents which they have read from best to worst. Alternatively, users can select on a scale (numeric, such as 1 to 10, or worded, such as good, medium, poor) how much they enjoyed reading a document. Further, user monitoring can measure time spent by users on each document, thereby indicating user interest (normalized by document length). Among other possibilities, the choices of documents for reading by other users can be simply used as an indication of interesting documents. In all cases, the feedback rating data can be based on interestingness or any of a variety of other document qualities, as described in connection with FIGS. 1–7.

Feedback ranking information can be used in a number of ways, and the invention is not limited by the method of feedback information use. Use methods range in spectrum from weighting relative ranks by a set amount (possibly equally, possibly heavy weighting one above the other) to dynamically adjusting the weight by measuring how statistically significant the user feedback is. For example, if only one person has ranked an article, it may not be significant. However, if many people have consistently ranked an article the same, more credibility may be placed on the user's weighting.

FIG. 9 shows a generalized embodiment of the invention in which system elements in a CASE system 30C are integrally configured to provide wire and/or demand searches. A query processor 32C receives queries from an individual user 34C and other users 36C. A mode selector 38C responds to the currently processed query to set a content-based filter structure 40C for wire search operation or demand search operation. In the preferred application of the invention, the wire mode is selected only if a wire already exists, and wires exist only for those queries found to be commonly entered as previously described. In the demand search mode, the filter structure 40C can function similarly to a normal search engine.

Otherwise, various schemes can be used for determining whether a wire search or a demand search is made. For example, every query can call for a wire search, with a demand search being made the first time a particular query is entered and with wire searches being made for subsequent entries of the same query. As another example, the user may select a demand search, or, if continuing network searching is desired, the user may select a wire search.

The filter structure 40C operates in its set wire search mode or demand search mode, and employs content-based profiles 42C in content-based filtering (preferably multi-level as described in connection with FIGS. 1–7). Wire profiles 42C I are adaptively updated with infornon-evaluation, feedback data from users respectively associated therewith. These profiles are used by the filter structure 40C in wire searches in the wire mode.

Demand profiles 42C2 are used by the filter structure 40C in demand searches in the demand mode. Collaborative profile data can be integrated with the wire profiles through agent mind melding 43C as previously explained.

A spider system 46C scans a network 44C to find informons for a current demand search, and to find informons with continued network scanning for existing wires. In selecting available informons for return, the spider system 46C uses a content threshold derived from the content-based profile for which an informon search is being conducted.

In many instances, it s preferable that the spider system 46C have a memory system 46CM which holds an informon data base wherein index information is stored from informons previously collected from the network. In this manner, demand searches can be quickly made from the spider memory 46CM as opposed to making a time consuming search and downloading in response to a search demand query from the search engine.

A search return processor 48C receives either demand search informons or wire search informons passed by the content-based filter structure 40C according to the operating mode of the latter, and includes an informon rating system which is like that of FIG. 6. The informon rating system combines content-based filtering data with collaborative feedback rating data, from users through a feedback processor 50C at least in the wire search mode and, if desired, in the demand search mode.

In the wire search mode, the processor 48C rates informons on a continuing basis as they are received from the network 44C through the spider system 46C as indicated by the reference character 48C1. In the demand search mode, the processor 48C rates informons returned by the spider system 46C in a demand search as indicated by the reference character 48C2. Collaborative rating data is used in the informon rating process in the wire search mode, and if applied in the demand search mode, to the extent that collaborative data is available for the informons in the search return. Search results are returned to the users 34C and 36C from the search return processor 48C as shown in FIG. 9.

Figure 10:
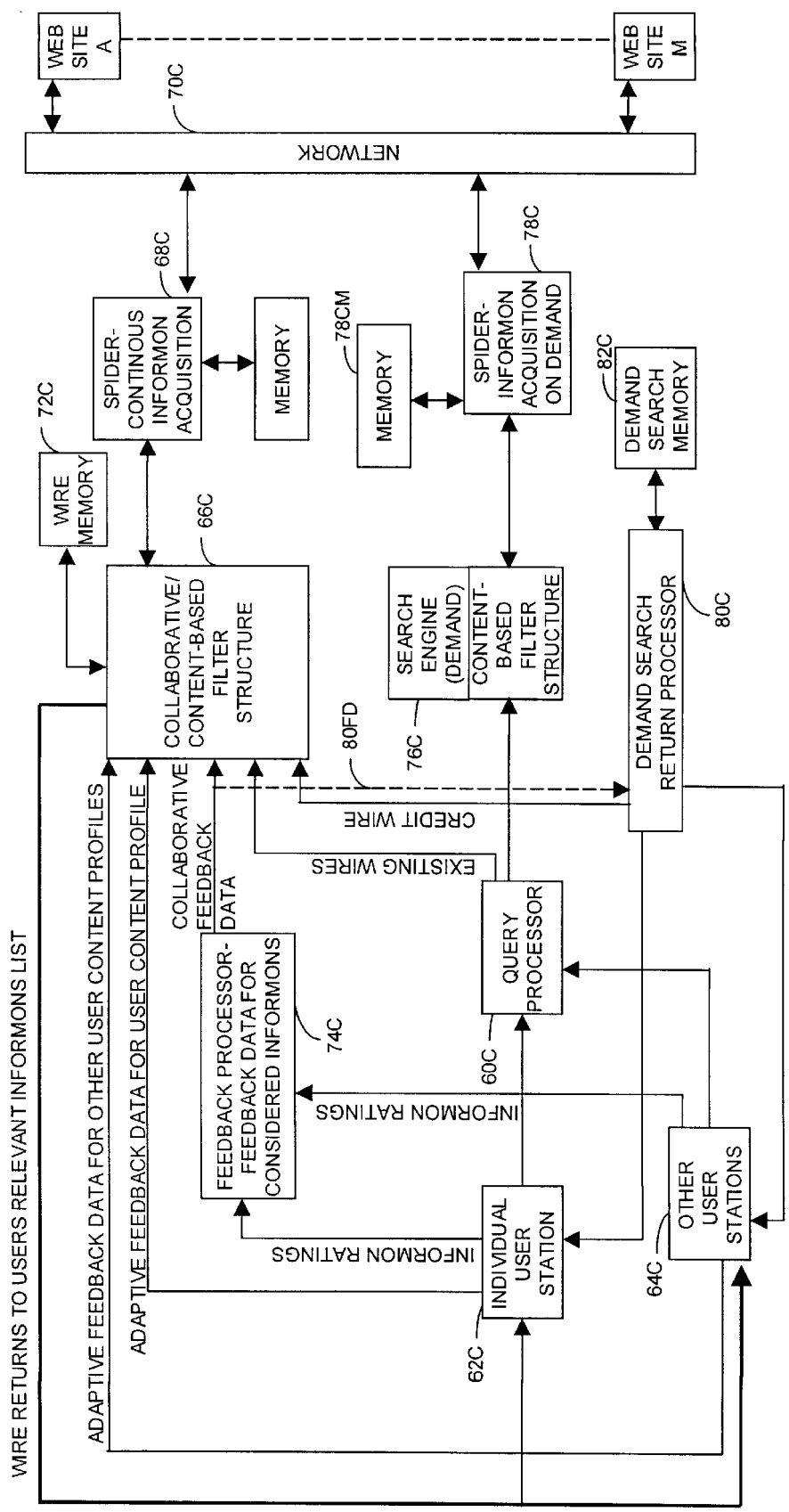
FIG. 10 shows another and presently preferred embodiment of the invention in which an information processing system includes an integrated filter structure providing collaborative/adaptive-content-based filtering to develop longer term, continuing responses to user queries, and a search engine structure which provides short term, demand responses to user queries, with the system directing user queries to the appropriate structure for responses.

The invention is preferably embodied as shown in FIG. 10. A query processor 60C receives queries from an individual user 62C and other users 64C and determines whether a wire already exists for each entered query. If a wire exists, the query is routed to a collaborative/content-based filter structure 66C like that of FIGS. 1–7. A spider system 68C continuously scans a network 70C for informons providing a threshold-level match for content based profiles (i.e., preprocessing profiles at the top level of the preferred multi-level filter structure, at least one of which reflects the content profile of a current wire query). Informons which are passed by the filter 66C for existing wires are stored in a memory 72C according to the wire or wires to which they belong.

A feedback processor 74C is structured like the mind pool system of FIG. 7 to provide collaborative feedback data for integration with the content-based data in the measurement of informon relevancy by the filter 66C. An informon rating structure like that of FIG. 6 is employed for this purpose. Adaptive feedback data is applied from the users to the filter 66C as shown in order to update content profiles as previously described.

If no wire exists for a currently input query, the query is sent to a regular search engine where a content profile is established for content based filtering of informons returned by a spider system 78C in a demand search of the network 70C. The spider system 78C can have its own memory system 78CM as considered in connection with the spider 46C of FIG. 9.

Once filtering is performed on returned informons, those informons which provide a satisfactory match to the query are returned as a list to the user through a search return processor 80C. The processor 80C creates a new wire for the current query for which a demand search was made, if a demand search memory 82C indicates that the current query has been made over time with sufficient frequency to qualify as a "common" query for which a wire is justified. As indicated by dashed connector line 80FD, collaborative feedback data can be, and preferably is, integrated into the demand search processing by the processor 80C.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

TABLE 1

| Article | Author | Rating given |
|---|---|---|
| 1 | A | 5 |
| 2 | B | 1 |
| 3 | B | 2 |
| 4 | B | 5 |
| 5 | C | 2 |
| 6 | C | 2 |
| 7 | C | 1 |
| 8 | C | 2 |
| 9 | C | 2 |
| 10 | C | 2 |

TABLE 2

| Article | Author | | | normalized | | | normalized |
|---|---|---|---|---|---|---|---|
| IRP (author) | | avg (author) | weight | weight | avg (all auth) | weight | weight |
| 11 | A | 5.00 | 3.12 | 0.86 | 2.40 | 0.49 | 0.14 | 4.65 |
| 12 | B | 2.67 | 0.23 | 0.32 | 2.40 | 0.49 | 0.66 | 2.49 |
| 13 | C | 1.83 | 6.00 | 0.92 | 2.40 | 0.49 | 0.06 | 1.86 |
| 14 | D | N/A | 0.00 | 0.00 | 2.40 | 0.49 | 1.00 | 2.40 |

What is claimed is:

1. A search engine system comprising:
a first system for receiving informons from a network on a continuing search basis, for filtering such informons for relevancy to a query from an individual user, and for storing a ranked list of relevant informons as a wire;
a second system for receiving informons from a network on a current demand search basis and for filtering such informons for relevancy to the query from the individual user; and
a third system for selecting at least one of the first and second systems to make a search for the query and to return the wire or demand search results to the individual user.

2. The system of claim 1 wherein the third system selects the first system to make a wire search only if a wire already exists for the query.

3. The system of claim 1 wherein:
a feedback system is provided for receiving collaborative feedback data from system users relative to informons considered by such users; and
at least the first system combines pertaining data from the feedback system with content profile data of the first system in filtering each informon for relevance to the query and inclusion in the wire.

4. The system of claim 3 wherein the first system includes a multi-level, content-based filter having descending levels including at least an upper preprocessing level, a middle user community level, and a bottom user level.

5. The method of claim 3 wherein the collaborative feedback data comprises active feedback data.

6. The method of claim 3 wherein the collaborative feedback data comprises passive feedback data.

7. The method of claim 6 wherein the passive feedback data is obtained by passively monitoring the actual response to a proposed informon.

8. The method of claim 3 wherein the collaborative feedback data comprises a combination of active feedback data and passive feedback data.

9. The system of claim 1 wherein adaptive user feedback data is applied at least to the first system to provide updating of content profile data employed therein.

10. A search engine system comprising:
a system for scanning a network to make a demand search for informons relevant to a query from an individual user;
a content-based filter system for receiving the informons from the scanning system and for filtering the informons on the basis of applicable content profile data for relevance to the query; and
a feedback system for receiving collaborative feedback data from system users relative to informons considered by such users;
the filter system combining pertaining feedback data from the feedback system with the content profile data in filtering each informon for relevance to the query.

11. The system of claim 10 wherein adaptive user feedback data is applied to the content-based filter to provide a learning component for content profile data employed therein.

12. The system of claim 10 wherein:
the scanning system further scans the network on a continuing basis to make a wire search for informons relevant to wire queries from system users; and
the filter system combines pertaining feedback data from the feedback system with applicable content profile data in filtering each wire informon for relevance to applicable wire query.

13. The system of claim 10 wherein the collaborative feedback data comprises active feedback data.

14. The system of claim 10 wherein the collaborative feedback data comprises passive feedback data.

15. The system of claim 14 wherein the passive feedback data is obtained by passively monitoring the actual response to a proposed informon.

16. The system of claim 10 wherein the collaborative feedback data comprises a combination of active feedback data and passive feedback data.

17. A search engine system comprising:
a content-based filtering system for receiving informons from a network on a continuing basis and for filtering the informons for relevancy to a wire or demand query from an individual user;
a feedback system providing feedback data from other users;
a system for controlling the operation of the filtering system to filter for one of a wire response and a demand response and to return the one response to the user; and
the filtering system combining pertaining feedback data from the feedback system with content profile data in determining the relevancy of the informons for inclusion in at least a wire response to the query.

18. The system of claim 17 wherein:
the content-based filtering system includes a collaborative/content based filter for filtering informons for relevancy to a wire query on a continuing basis; and the content-based filtering system includes a regular search engine for filtering informons for relevancy to a demand query.

19. The system of claim 18 wherein adaptive user feedback data is applied at least to the collaborative/content-based filter to provide learning for content profile data employed therein.

20. The search engine system of claim 17 wherein the feedback system provides active feedback data.

21. The search engine system of claim 17 wherein the feedback system provides passive feedback data.

22. The search engine system of claim 21 wherein the passive feedback data is obtained by passively monitoring the actual response to a proposed informon.

23. The system of claim 17 wherein the feedback system provides a combination of active feedback data and passive feedback data.

24. A method for operating a search engine system comprising:
    receiving informons in a first system from a network on a continuing search basis, for filtering such informons for relevancy to a query from an individual user and for storing a ranked list of relevant informons as a wire;
    receiving informons in a second system from a network on a current demand search basis for filtering such informons for relevancy to the query from the individual user; and
    selecting at least one of the first and second systems to make a search for the query and to return the wire or demand search results to the individual user.

25. A method for operating a search engine system comprising:
    scanning a network to make a demand search for informons relevant to a query from an individual user;
    receiving the informons in a content-based filter system from the scanning system and filtering the informons on the basis of applicable content profile data for relevance to the query;
    receiving collaborative feedback data from system users relative to informons considered by such users; and
    combining pertaining feedback data with the content profile data in filtering each informon for relevance to the query.

26. The method of claim 25 wherein the collaborative feedback data comprises active feedback data.

27. The method of claim 25 wherein the collaborative feedback data provides passive feedback data.

28. The method of claim 27 wherein the passive feedback data is obtained by passively monitoring the actual response to a proposed informon.

29. The method of claim 25 wherein the collaborative feedback data comprises a combination of active feedback data and passive feedback data.

30. A method for operating a search engine system comprising:
    receiving informons in a content-based filtering system from a network on a continuing basis and filtering the informons for relevancy to a wire or demand query from an individual user;
    providing feedback data from other users;
    controlling the operation of the filtering system to filter for one of a wire response and a demand response and to return the one response to the user; and
    combining pertaining feedback data with content profile data in the filtering system in determining the relevancy of the informons for inclusion in at least a wire response to the query.

31. The method of claim 30 wherein the step of providing feedback data comprises providing active feedback data.

32. The method of claim 30 wherein the step of providing feedback data comprises providing passive feedback data.

33. The method of claim 32 wherein the passive feedback data is obtained by passively monitoring the actual response from at least one of the other users to a proposed informon.

34. The method of claim 30 wherein the step of providing feedback data comprises providing a combination of active feedback data and passive feedback data.

35. A search engine system comprising:
    means for receiving informons from a network on a continuing search basis, for filtering such informons for relevancy to a query from an individual user, and for storing a ranked list of relevant informons as a wire;
    means for receiving informons from a network on a current demand search basis and for filtering such informons for relevancy to the query from the individual user; and
    means for selecting at least one of the first and second systems to make a search for the query and to return the wire or demand search results to the individual user.

36. A search engine system comprising:
    means for content-based filtering informons received from a network on a continuing basis for relevancy to a wire or demand query from an individual user;
    means for collecting feedback data from other users;
    means for controlling the operation of the filtering means to filter for one of a wire response and a demand response and to return the one response to the user; and
    the filtering means combining pertaining feedback data from the feedback system with content profile data in determining the relevancy of the informons for inclusion in at least a wire response to the query.

* * * * *

US006314420C1

(12) EX PARTE REEXAMINATION CERTIFICATE (9836th)
United States Patent
Lang et al.

(10) Number: US 6,314,420 C1
(45) Certificate Issued: *Sep. 13, 2013

(54) COLLABORATIVE/ADAPTIVE SEARCH ENGINE

(75) Inventors: Andrew K. Lang, Pittsburgh, PA (US); Donald M. Kosak, Pittsburgh, PA (US)

(73) Assignee: I/P Engine, Inc., New York, NY (US)

Reexamination Request:
No. 90/009,991, May 24, 2012

Reexamination Certificate for:
Patent No.: 6,314,420
Issued: Nov. 6, 2001
Appl. No.: 09/204,149
Filed: Dec. 3, 1998

( * ) Notice: This patent is subject to a terminal disclaimer.

Related U.S. Application Data

(63) Continuation-in-part of application No. 08/627,436, filed on Apr. 4, 1996, now Pat. No. 5,867,799.

(51) Int. Cl.
*G06F 17/30* (2006.01)

(52) U.S. Cl.
USPC ..... 707/3; 707/10; 707/2; 707/5; 717/E17.06; 717/E17.109

(58) Field of Classification Search
None
See application file for complete search history.

(56) References Cited

To view the complete listing of prior art documents cited during the proceeding for Reexamination Control Number 90/009,991, please refer to the USPTO's public Patent Application Information Retrieval (PAIR) system under the Display References tab.

*Primary Examiner* — Jason Proctor

(57) ABSTRACT

A search engine system is provided for a portal site on the internet. The search engine system employs a regular search engine to make one-shot or demand searches for information entities which provide at least threshold matches to user queries. The search engine system also employs a collaborative/content-based filter to make continuing searches for information entities which match existing wire queries and are ranked and stored over time in user-accessible, system wires corresponding to the respective queries. A user feedback system provides collaborative feedback data for integration with content profile data in the operation of the collaborative/content-based filter. A query processor determines whether a demand search or a wire search is made for an input query.

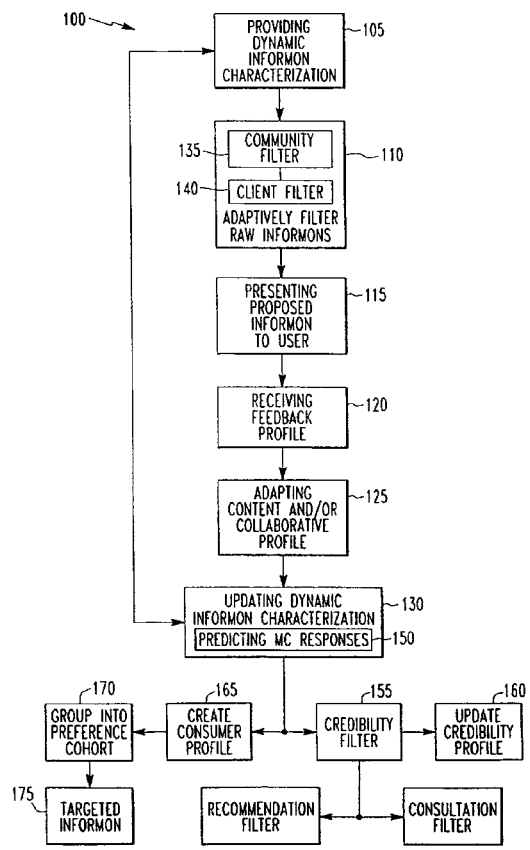

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 10, 14, 15, 25, 27 and 28 is confirmed.

Claims 1-9, 11-13, 16-24, 26 and 29-36 were not reexamined.

\* \* \* \* \*

(12) EX PARTE REEXAMINATION CERTIFICATE (10237th)
United States Patent
Lang et al.

(10) Number: US 6,314,420 C2
(45) Certificate Issued: *Jul. 31, 2014

(54) COLLABORATIVE ADAPTIVE SEARCH ENGINE

(75) Inventors: Andrew K. Lang, Pittsburgh, PA (US); Donald M. Kosak, Pittsburgh, PA (US)

(73) Assignee: I/P Engine, Inc., New York, NY (US)

Reexamination Request:
No. 90/020,057, Aug. 19, 2013

Reexamination Certificate for:
Patent No.: 6,314,420
Issued: Nov. 6, 2001
Appl. No.: 09/204,149
Filed: Dec. 3, 1998

Reexamination Certificate C1 6,314,420 issued Sep. 13, 2013

(*) Notice: This patent is subject to a terminal disclaimer.

Related U.S. Application Data

(63) Continuation-in-part of application No. 08/627,436, filed on Apr. 4, 1996, now Pat. No. 5,867,799.

(51) Int. Cl.
*G06F 17/30* (2006.01)

(52) U.S. Cl.
CPC ... *G06F 17/30867* (2013.01); *Y10S 707/99932* (2013.01); *Y10S 707/99933* (2013.01); *Y10S 707/99935* (2013.01); *Y10S 707/99931* (2013.01)

USPC .............. 707/722; 707/999.002; 707/999.003; 707/999.005; 707/999.001; 707/E17.06

(58) Field of Classification Search
None
See application file for complete search history.

(56) References Cited

To view the complete listing of prior art documents cited during the proceeding for Reexamination Control Number 90/020,057, please refer to the USPTO's public Patent Application Information Retrieval (PAIR) system under the Display References tab.

*Primary Examiner* — Dennis Bonshock

(57) ABSTRACT

A search engine system is provided for a portal site on the internet. The search engine system employs a regular search engine to make one-shot or demand searches for information entities which provide at least threshold matches to user queries. The search engine system also employs a collaborative/content-based filter to make continuing searches for information entities which match existing wire queries and are ranked and stored over time in user-accessible, system wires corresponding to the respective queries. A user feedback system provides collaborative feedback data for integration with content profile data in the operation of the collaborative/content-based filter. A query processor determines whether a demand search or a wire search is made for an input query.

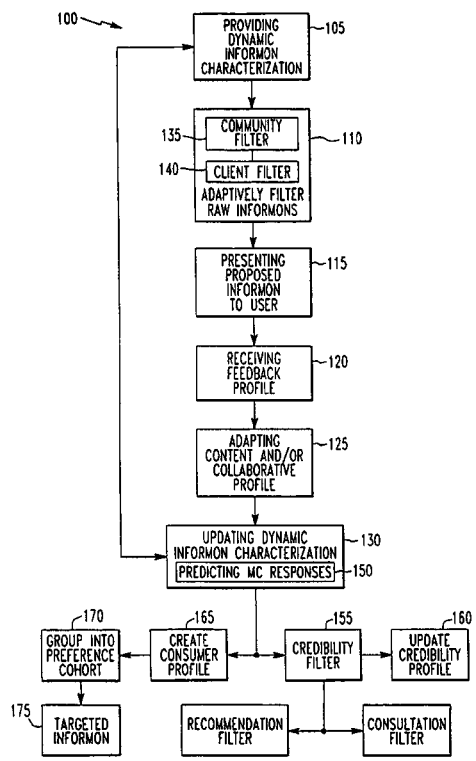

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 10, 14, 15, 25, 27 and 28 is confirmed.

Claims 1-9, 11-13, 16-24, 26 and 29-36 were not reexamined.

* * * * *